United States Patent
Andersson et al.

(10) Patent No.: US 10,735,735 B2
(45) Date of Patent: Aug. 4, 2020

(54) GUIDED TRANSCODING

(71) Applicant: Telefonaktiebolaget LM Ericsson (publ), Stockholm (SE)

(72) Inventors: Kenneth Andersson, Gävle (SE); Thomas Rusert, Kista (SE); Christopher Hollmann, Uppsala (SE); Jonatan Samuelsson, Enskede (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/332,744

(22) PCT Filed: Sep. 15, 2016

(86) PCT No.: PCT/EP2016/071776
§ 371 (c)(1),
(2) Date: Mar. 12, 2019

(87) PCT Pub. No.: WO2018/050226
PCT Pub. Date: Mar. 22, 2018

(65) Prior Publication Data
US 2020/0059647 A1 Feb. 20, 2020

(51) Int. Cl.
*H04N 19/129* (2014.01)
*H04N 19/159* (2014.01)
(Continued)

(52) U.S. Cl.
CPC ......... *H04N 19/129* (2014.11); *H04N 19/159* (2014.11); *H04N 19/176* (2014.11); *H04N 19/40* (2014.11); *H04N 19/70* (2014.11)

(58) Field of Classification Search
None
See application file for complete search history.

(56) References Cited

U.S. PATENT DOCUMENTS

2009/0046941 A1 2/2009 Mietens et al.
2011/0249755 A1* 10/2011 Shibahara ............ H04N 19/129
375/240.18

FOREIGN PATENT DOCUMENTS

WO 2005086487 A1 9/2005
WO 2015053673 A1 4/2015

OTHER PUBLICATIONS

Boyce, Jill, et al., "Overview of SHVC: Scalable Extensions of the High Efficiency Video Coding (HEVC) Standard," IEEE Transactions on Circuits and Systems for Video Technology, 2015, 15 pages.
(Continued)

*Primary Examiner* — Christopher G Findley
(74) *Attorney, Agent, or Firm* — Withrow & Terranova, PLLC

(57) ABSTRACT

Delta quantized coefficients of a pixel block in a picture in a first representation of a video sequence are encoded based on information derived from estimated quantized coefficients for the pixel block. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

18 Claims, 14 Drawing Sheets

(51) Int. Cl.
*H04N 19/176* (2014.01)
*H04N 19/40* (2014.01)
*H04N 19/70* (2014.01)

(56) References Cited

OTHER PUBLICATIONS

Chen, Jianle, et al., "Description of scalable video coding technology proposal by Qualcomm (configuration 2)," Joint collaborative Team on Video Coding (JCT-VC) of ITU-T SG16 WP3 and ISO/IEC JTC1/SC29/WG11, Document: JCTVC-K00366, Shanghai, China, Oct. 2012, 22 pages.

Choi, Woon Il, et al., "The Efficient Coding Technique using Inter-layer Prediction," International Organization for Standardization ISO/IEC JTC1/SC29/WG11 MPEG2005/M11667, Hong Kong, Jan. 2005, 7 pages.

Nordgren, Harald, "Guided Transcoding for Next-Generation Video Coding (HEVC)," Master's Thesis, Lund University, Department of Computer Science, Faculty of Engineering LTH, ISSN 1650-2884, May 11, 2016, 55 pages.

Sole, Joel, et al., "Transform Coefficient Coding in HEVC," IEEE Transactions on Circuits and Systems for Video Technology, vol. 22, No. 12, Dec. 2012, pp. 1765-1777.

International Search Report and Written Opinion for International Patent Application No. PCT/EP2016/071776, dated May 31, 2017, 13 pages.

Written Opinion for International Patent Application No. PCT/EP2016/071776, dated Aug. 6, 2018, 7 pages.

International Preliminary Report on Patentability for International Patent Application No. PCT/EP2016/071776, dated Nov. 26, 2018, 20 pages.

\* cited by examiner

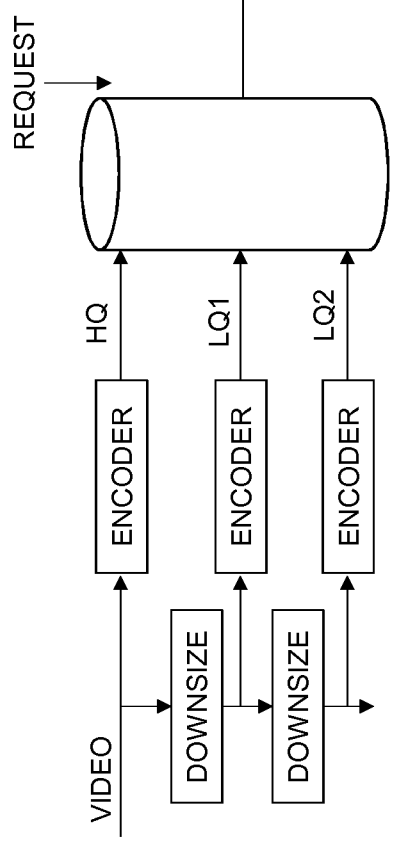
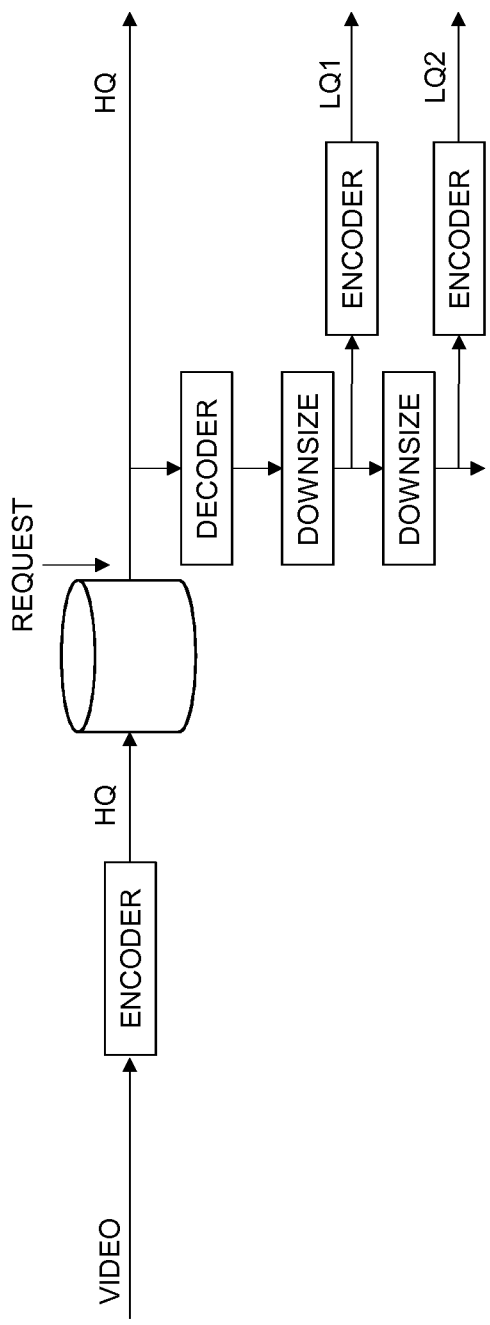

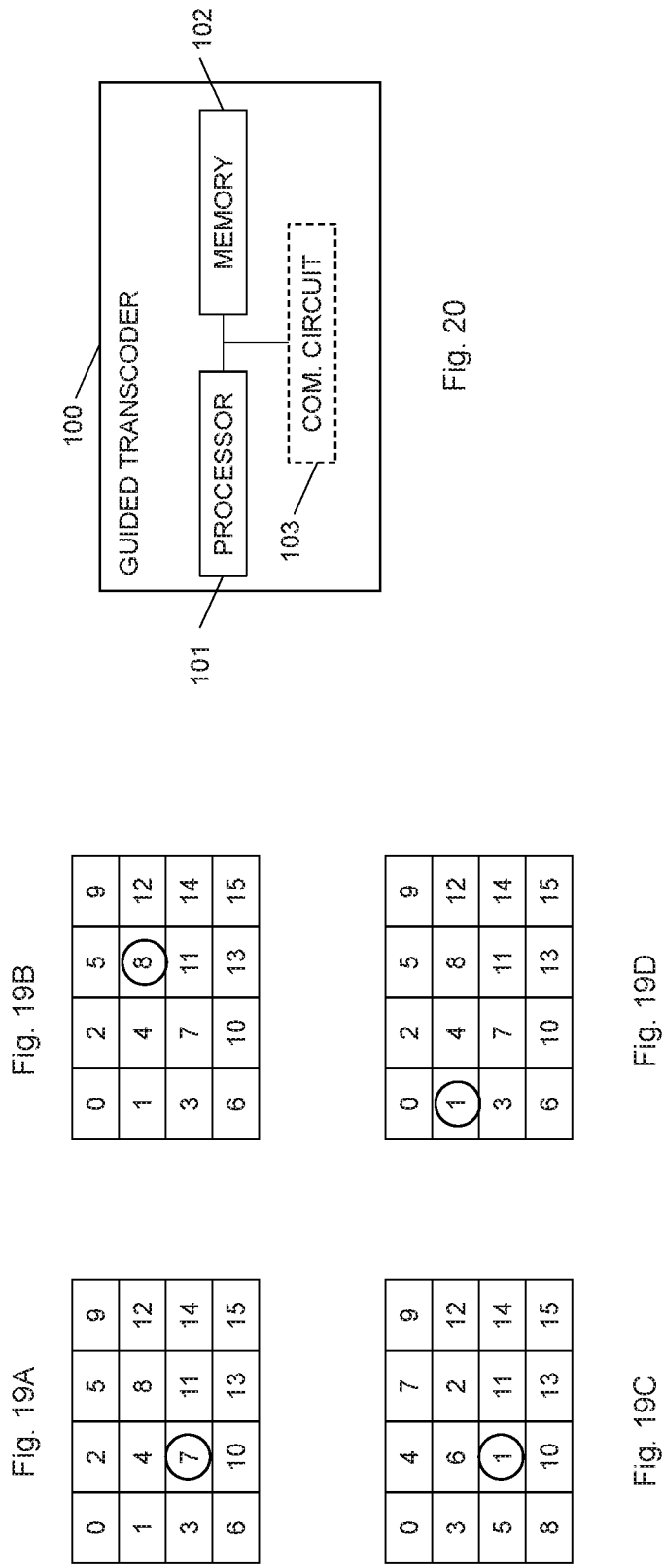

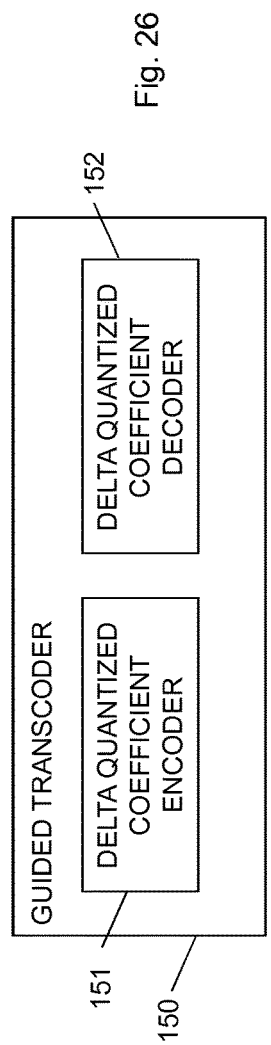
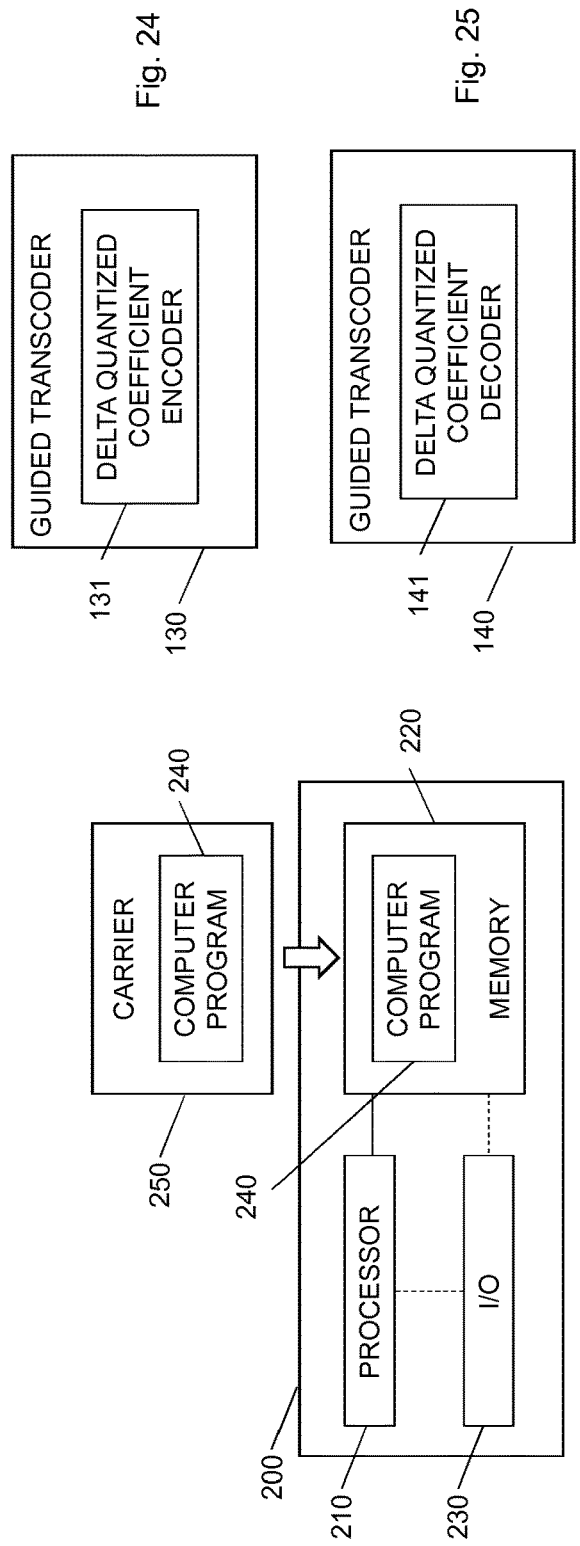

GUIDED TRANSCODING

This application is a 35 U.S.C. § 371 national phase filing of International Application No. PCT/EP2016/071776, filed Sep. 15, 2016, the disclosure of which is incorporated herein by reference in its entirety.

TECHNICAL FIELD

The present embodiments generally relate to quantized coefficient coding, and in particular to encoding and decoding of quantized coefficients in connection with guided transcoding of video sequences.

BACKGROUND

Video consumption is driving rapid growth of fixed and mobile network traffic. Being the dominant traffic type already today, video is expected to drive the overall network traffic to a multiple of today's volume and account for more than 70% of all network traffic within few years. The growth is primarily driven by streamed video on-demand (VoD) content, as consumers increasingly demand access to any content on any device at any time. VoD services are commonly operated on cloud-based video platforms, wherein all processing is executed in software running on generic servers, as such platforms can provide beneficial properties related to scalability, cost efficiency, and ubiquitous availability.

VoD content is typically delivered using adaptive bit rate (ABR) streaming techniques, where each video asset is made available in several different representations coded at different bit rates and/or quality levels so that video clients can choose representations according to bandwidth availability, device capabilities, etc.

FIGS. 1 to 3 illustrate three different VoD approaches generally denoted simulcast (FIG. 1), transcoding (FIG. 2) and guided transcoding (FIG. 3). In the simulcast approach, the original video sequence is encoded at different bit rates and/or quality levels, represented as high quality (HQ) and different low quality (LQ) versions in the figures, and the resulting HQ and LQ bit streams are stored. Accordingly, a bit stream of given bit rate and/or quality level can be retrieved from the storage and sent to the client upon request. Simulcast focuses on reducing the coding complexity since all desired bit rates and/or quality levels of the original video sequence are encoded and stored before the actual request. Once the request arrives, the server can just select the requested bit rate and/or quality level and transmit it without any further computations. The problem with the simulcast approach is, though, that it requires large storage capacity.

The transcoding approach shown in FIG. 2 tries to reduce the storage demands as much as possible. Accordingly, only the highest bit rate and/or quality level is encoded and stored. Once the request is received from the client and the request is for a LQ version of the video sequence, the server has to decode the HQ version, downsize it to the requested bit rate and/or quality level and encode the LQ version of the video. The transcoding approach thereby allows the server to save much of the storage capacity that the simulcast approach required but at the cost of increasing computational complexity. The high computational complexity is a main disadvantage of the transcoding approach.

Guided transcoding as shown in FIG. 3 is a compromise between the simulcast and transcoding approaches. This approach tries to reduce both the computational complexity of encoding the LQ versions of the video sequence on demand and the storage requirements of storing all HQ and LQ versions of the video sequence. The first part of guided transcoding is similar to simulcast. However, in clear contrast to the simulcast approach, not all data is stored for the LQ versions of the video sequence. In clear contrast, only so-called side information (SI) is stored for these LQ versions, while the actual picture data in terms of residual data and transform coefficients is removed from the bit streams. The SI contains inter motion information, intra mode information and details of how the pictures are dived into coding units (CUs), prediction units (PUs) and transform units (TUs), which are expensive and time consuming to calculate. However, as the actual picture data is not retained, the required storage space is much less as compared to the simulcast approach. Furthermore, by using the SI when receiving a request for a LQ version of the video, the actual encoding process is much faster since the data that is most expensive to generate is already present in the SI.

A variant of guided transcoding, denoted deflation, is presented in section 2.2 Deflation on pages 18-19 in [1]. In deflation, the intra mode information and inter motion information from a LQ bit stream is used to obtain a prediction, which is used together with a downsized reconstruction of the HQ bit stream to calculate a residual. The residual is frequency transformed and quantized and then subtracted from transform coefficients in the LQ bit stream. In this variant of guided transcoding, the SI also contains the difference between the transform coefficients and the transformed and quantized residual.

The deflation variant of guided transcoding can produce LQ versions of same quality as for direct encoding without transcoding, however at the cost of storing a larger amount of data as SI for the different LQ versions of the video sequence.

Thus, there is still a need for improvement within guided transcoding.

SUMMARY

It is a general objective to provide an efficient quantized coefficient coding.

This and other objectives are met by embodiments described herein.

An aspect of the embodiments relates to a quantized coefficient encoding method. The method comprises encoding delta quantized coefficients of a pixel block in a picture in a first representation of a video sequence based on information derived from estimated quantized coefficients for the pixel block. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

Another aspect of the embodiments relates to a quantized coefficient decoding method. The method comprises decoding encoded delta quantized coefficients of a pixel block in a picture in a first representation of a video sequence based on information derived from estimated quantized coefficients for the pixel block to obtain delta quantized coefficients. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

A further aspect of the embodiments relates to a guided transcoder configured to encode delta quantized coefficients of a pixel block in a picture in a first representation of a video sequence based on information derived from estimated quantized coefficients for the pixel block. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

Another aspect of the embodiments relates to a guided transcoder comprising a delta quantized coefficient encoder for encoding delta quantized coefficients of a pixel block in a picture in a first representation of a video sequence based on information derived from estimated quantized coefficients for the pixel block. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

A further aspect of the embodiments relates to a guided transcoder configured to decode encoded delta quantized coefficients of a pixel block in a picture in a first representation of a video sequence based on information derived from estimated quantized coefficients for the pixel block to obtain delta quantized coefficients. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

Yet another aspect of the embodiments relates to a guided transcoder comprising a delta quantized coefficient decoder for decoding encoded delta quantized coefficients of a pixel block in a picture in a first representation of a video sequence based on information derived from estimated quantized coefficients for the pixel block to obtain delta quantized coefficients. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

A further aspect of the embodiments relates to a computer program comprising instructions, which when executed by at least one processor, cause the at least one processor to encode delta quantized coefficients of a pixel block in a picture in a first representation of a video sequence based on information derived from estimated quantized coefficients for the pixel block. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

Yet another aspect of the embodiments relates to a computer program comprising instructions, which when executed by at least one processor, cause the at least one processor to decode encoded delta quantized coefficients of a pixel block in a picture in a first representation of a video sequence based on information derived from estimated quantized coefficients for the pixel block to obtain delta quantized coefficients. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

A further aspect of the embodiments relates to a carrier comprising the computer program according to above. The carrier is one of an electronic signal, an optical signal, an electromagnetic signal, a magnetic signal, an electric signal, a radio signal, a microwave signal, or a computer-readable storage medium.

The present embodiments achieve an efficient encoding and decoding of quantized coefficients, for instance in connection with guided transcoding.

BRIEF DESCRIPTION OF THE DRAWINGS

The embodiments, together with further objects and advantages thereof, may best be understood by making reference to the following description taken together with the accompanying drawings, in which:

FIG. 1 is a schematic representation of VoD employing a simulcast approach;

FIG. 2 is a schematic representation of VoD employing a transcoding approach;

FIGS. 19A to 19D schematically represent adjusting scanning pattern in connection with encoding and decoding delta quantized coefficients according to an embodiment;

FIG. 20 is a schematic illustration of a guided transcoder according to an embodiment;

FIG. 23 is a schematic block diagram of a computer-program-based implementation of an embodiment;

FIG. 24 is a schematic illustration of a guided transcoder according to yet another embodiment;

FIG. 25 is a schematic illustration of a guided transcoder according to a further embodiment;

FIG. 26 is a schematic illustration of a guided transcoder according to an embodiment;

DETAILED DESCRIPTION

Figure 3:
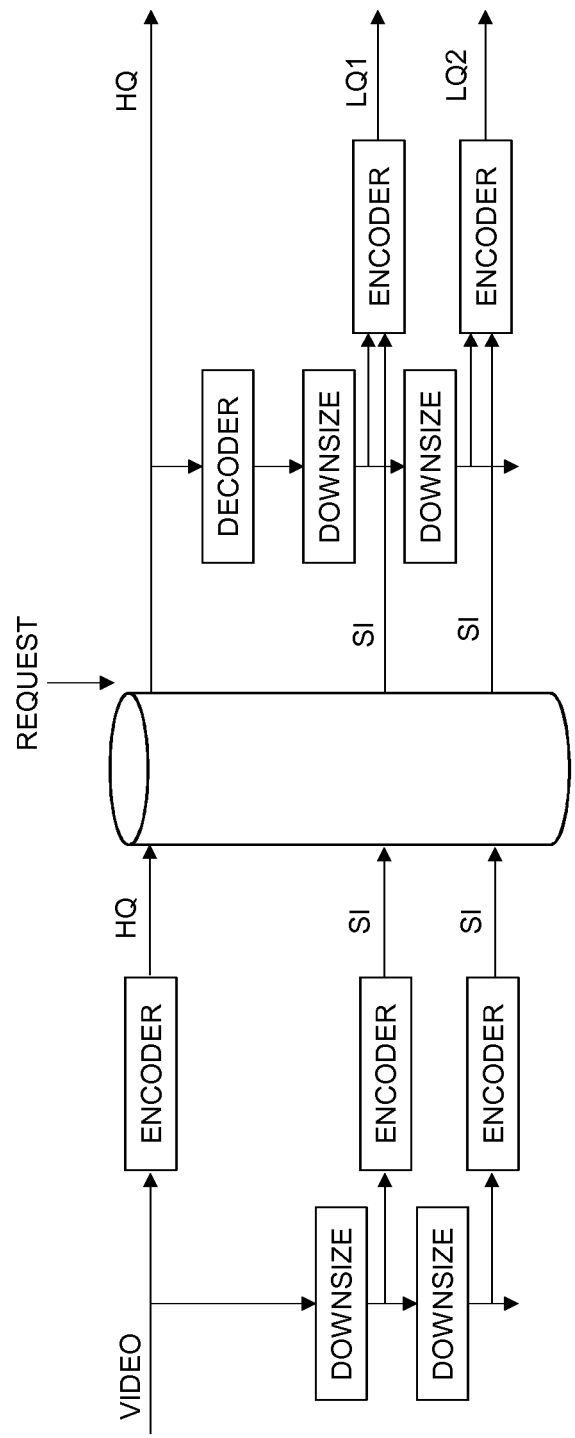
FIG. 3 is a schematic representation of VoD employing a guided transcoding approach.
Figure 4A:
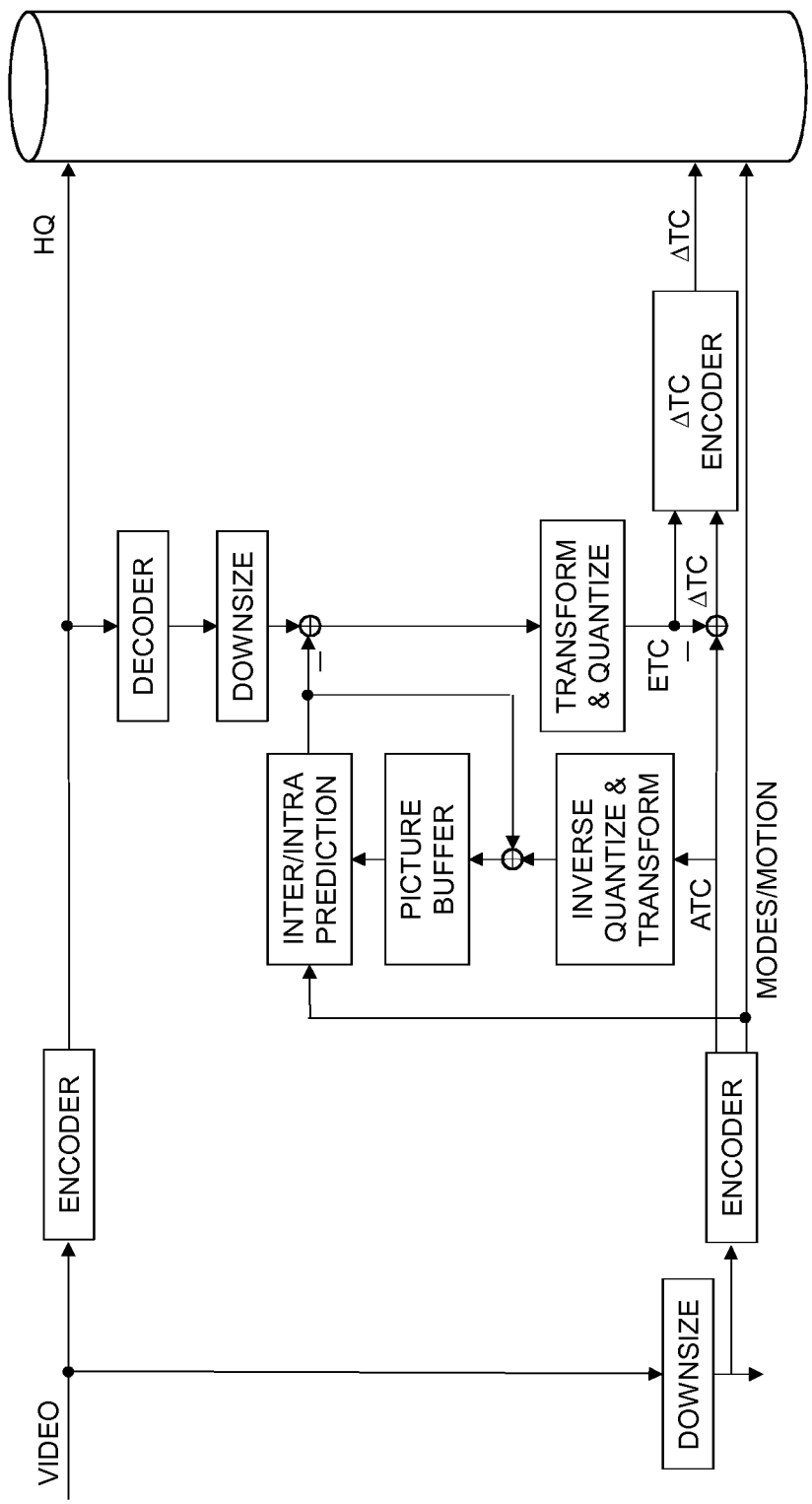
FIGS. 4A and 4B are a schematic representation of VoD employing a guided transcoding approach according to an embodiment.
Figure 4B:
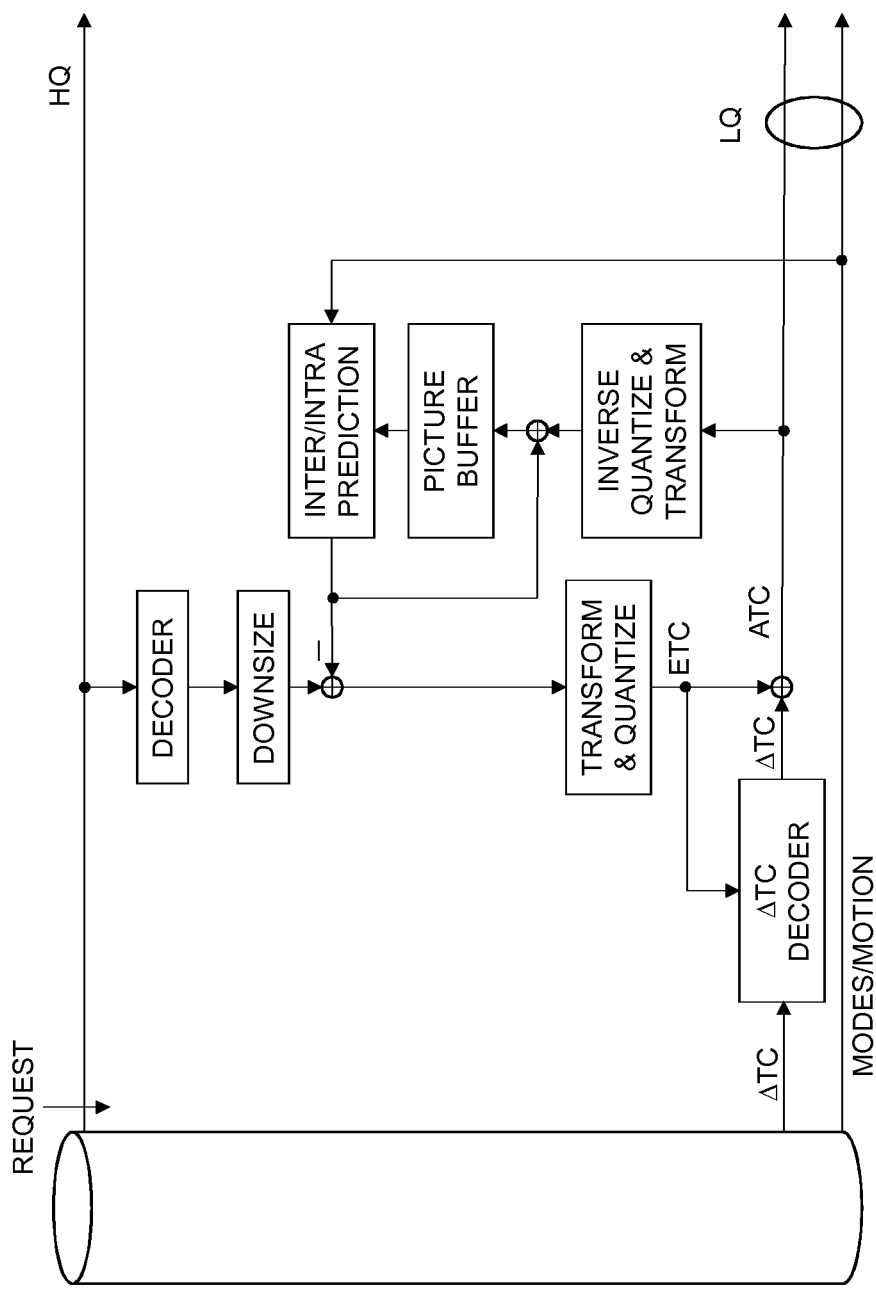

Throughout the drawings, the same reference numbers are used for similar or corresponding elements. FIGS. 4A and 4B illustrate a VoD approach based on a version of guided transcoding. In this version of guided transcoding, not only inter motion information, intra mode information and details of how the pictures are divided into CUs, PUs, and TUs are stored as side information (SI). In clear contrast, also residual data in the form of transform coefficient data is stored to be used when generating a LQ version of the video sequence. In this guided transcoding, so called delta transformed coefficients (ΔTCs) are stored instead of the actual transform coefficients (ATCs) in order to reduce the amount of data that need to be stored. The ATCs can then be generated based on the ΔTCs and estimated transform coefficients (ETCs).

In the guided transcoding shown in FIG. 4A, the ETCs are determined based on the HQ version of the video sequence, which is first encoded and stored in the storage. The encoded HQ version is also decoded and then downsized. The ATCs are produced by downsizing the original video sequence and encoding it. The ΔTCs are calculated as the difference between the ATCs and the ETCs, encoded and stored together with the above mentioned inter motion information, intra mode information and details of how the pictured are divided into CUs, PUs, and TUs.

Once the request for a LQ version arrives, the stored HQ version of the video sequence is decoded and downsized, see FIG. 4B, to the requested bit rate and/or quality level. This is used to derive the ETCs. The encoded ΔTCs are retrieved from the memory and used to reconstruct the ATCs using the ETCs. The reconstructed ATCs constitute together with the other side information retrieved from the memory, a LQ bit stream that can be sent to the client.

Embodiments as disclosed herein enable an efficient encoding and decoding of the ΔTCs. This encoding of ΔTCs reduces the amount of data that need to be stored for the transform coefficients as compared to directly storing the difference between ATCs and ETCs.

In High Efficiency Video Coding (HEVC), also referred to as H.265, a difference between a source block in a picture of a video sequence and its intra or inter predicted block, generally referred to as residual or residual block, is transform coded to obtain transform coefficients if a transform skip flag is set to 0, otherwise the residual block is coded without a transform. After deriving transform coefficients or residual pixel values (if transform skip flag is set to 1) on the encoder side, quantization is applied. The quantization is controlled by a quantization parameter (QP). When the QP is high the transform coefficients or residual pixel values are quantized coarsely and when the QP is low the transform coefficients or residual pixel values are quantized finely.

In HEVC the quantized transform coefficients are encoded by defining a one dimensional scan covering all transform coefficients. The transform coefficients can be viewed as a two dimensional block, generally denoted transform block (TB) in the art, where each position corresponds to a specific transform function (basis function). The scan starts from the last non-zero coefficients along a scanning pattern that ends up at the most low frequency coefficient. The position of the last non-zero coefficient is encoded first by the syntax elements last_significant_coeff_x_prefix, last_significant_coeff_prefix, last_significant_coeff_x_suffix and last_significant_coeff_y_suffix. Then, a significance map is encoded. If the transform block size is larger than 4×4, it is divided into 4×4 sub-blocks. The encoding of the significance map comprises encoding 4×4 sub-blocks flags (coded_sub_block_flag) according to a 1D sub-block scanning pattern covering the 4×4 sub-blocks from the last significant position towards the origin, i.e. the 4×4 sub-block at top left corner of the transform block that includes the lowest frequency basis function e.g. DC coefficient. These 4×4 sub-blocks flags indicate which sub-block(s) that contain(s) non-zero transform coefficients. The encoding of the significance map also comprises encoding significance flags (significant_coeff_flag) at each position along a scanning pattern indicating if a transform coefficient is non-zero or not. Then, magnitudes (coeff_abs_level_greater1_flag, coeff_abs_level_greater2_flag, coeff_abs_level_remaining) and signs (coeff_sign_flag) of the non-zero transform coefficients are encoded. The coding is performed to produce a coded bit stream using Context Adaptive Binary Arithmetic Coding (CABAC). A general overview of transform coefficient coding can be found in [2].

Transform coefficient coding is also used in coding standards other than HEVC, such as H.264/Advanced Video Coding (AVC).

In the following, various embodiments of encoding and decoding quantized coefficients are further described. The coefficients are advantageously transform coefficients as mentioned above, for instance in HEVC and if the transform skip flag is 0. In another embodiment, the coefficients represent the residual pixel values if no transformation is applied to the residual pixel values, such as if the transform skip flag is 1 in HEVC. The coefficients are preferably quantized as mentioned above to obtain quantized coefficients, such as quantized transform coefficients or quantized coefficients representing quantized residual pixel values.

Figure 5:
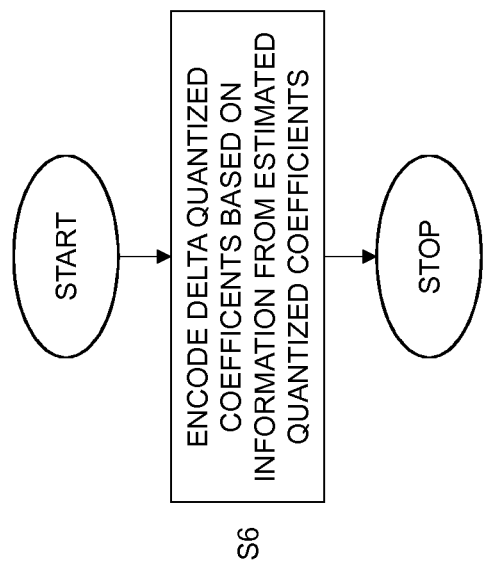
FIG. 5 is a flow chart illustrating a quantized coefficient encoding method according to an embodiment.

FIG. 5 is a flow chart illustrating a quantized coefficient encoding method according to an embodiment. The method comprises encoding, in step S6, delta quantized coefficients of a pixel block in a picture in a first representation of a video sequence based on information derived from estimated quantized coefficients for the pixel block.

The delta quantized coefficients represent a difference between i) actual quantized coefficients of the pixel block derived by encoding at least a portion of the picture in the first representation of the video sequence and ii) the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

FIG. 4A illustrates an implementation example of the quantized coefficient encoding method as applied to guided transcoding. In FIG. 4A the first representation of the video sequence is a LQ representation obtained by downsizing an original video sequence. A pixel block in a picture of the LQ representation is then encoded in order to derive, among others, intra mode information or inter motion information that identifies a prediction block in the current picture, in the case of intra mode information, or in at least one other picture, in the case of inter motion information, of the LQ representation of the video sequence. The encoding of the pixel block also generates quantized coefficients (ATCs), such as quantized transform coefficients if the transform skip flag is set to 0 for the pixel block.

The second representation of the video sequence, which is represented by an encoded HQ version of the video sequence in FIG. 4A, is decoded and downsized in order to get a reconstructed block that is in a same bit rate and/or quality level as the current pixel block. The difference between this reconstructed block and the prediction block identified based on the intra mode information or inter motion information is calculated, transformed (if the transform skip flag is 0) and quantized to obtain the estimated quantized coefficients (ETCs). In the illustrated embodiment, the delta quantized coefficients (ΔTCs) for the pixel block are calculated as the difference between the actual quantized coefficients and the estimated quantized coefficients.

The resulting delta quantized coefficients are then input to a delta quantized coefficient encoder that additionally receives the estimated quantized coefficients. This delta quantized coefficient encoder encodes the delta quantized coefficients based on information derived from the estimated quantized coefficients.

This means that the delta quantized coefficient encoder exploits information from the estimated quantized coefficients during the encoding of the delta quantized coefficients. This reduces the overhead of representing the delta quantized coefficients since the encoder can exploit correlations between the delta and estimated quantized coefficients, which is further described herein. As a consequence, a more efficient coding of delta quantized coefficients is achieved, generally resulting in representing the encoded delta quantized coefficients by a smaller amount of data as compared to not encoding the delta quantized coefficients based on information derived from the estimated quantized coefficients.

The pixel block, the delta quantized coefficients of which are encoded in step S6, is typically a so-called residual block with quantized transform coefficients (transform skip flag is 0) or a residual block with quantized residual pixel values (transform skip flag is 1). In another embodiment, the pixel block is a pulse code modulation (PCM) block. A PCM block is encoded by bypassing prediction, transformation, quantization and entropy coding.

In the context of guided transcoding, one could derive a differential PCM (DPCM) block by a difference between reconstructed values of a PCM block from the second representation of the video sequence, possibly resized or rescaled, and the PCM block from the first representation of the video sequence. For instance, the magnitudes or vales of the PCM block in the second representation could be used to derive bit depth for the coding of the DPCM block. Small PCM values, i.e. low magnitude, in the second representation of the video sequence would likely correspond to small bit depth for the encoding of the DPCM block. Thus, what could be gained in this embodiment is the encoding of the bit depth for respective position in the DPCM block. In order to solve any parsing dependency, the number of positions for respective bit depth and the bit depth may be encoded. Then values can be decoded and positioned according to the estimated bit depths using the PCM values in the second representation.

In another embodiment relating to PCM, the so called estimated quantized coefficients are pixel values based on a second representation of the video sequence, possibly following rescaling, such as up- or downscaling, and the actual quantized coefficients are the pixel values in a first representation version of the video sequence. Since these pixel values from the first and second representations of the video sequence are similar, the distribution of the difference thereof, i.e. DPCM values, is centered around 0. This property can be exploited by entropy coding, e.g. Huffman coding or CABAC coding.

In an embodiment, the estimated quantized coefficients represent a difference between a reconstructed block of the corresponding picture occupying a corresponding position in the corresponding picture as the pixel block occupies in the picture. In this embodiment, the prediction block is obtained, e.g. identified, based on the intra mode information and/or inter motion information of determined for the pixel block during encoding of the pixel block.

Thus, assume that the current pixel block is of a size N×N pixels or samples and occupy the position (x, y) in the current picture of the first representation of the video sequence. Then the reconstructed block is preferably of a size N×N pixels or samples and occupies the position (x, y)

in the corresponding picture of the second representation of the video sequence. In other words, the pixel block and the reconstructed block are co-located blocks.

The intra mode information preferably represents one of the available intra modes, also referred to as intra prediction modes. For instance, HEVC specifies 33 directional intra modes for intra prediction, whereas H.264/AVC specifies 8 directional intra modes for intra prediction. HEVC also specifies DC intra prediction and planar prediction modes. The DC intra prediction mode generates a mean value by averaging reference samples and can be used for flat surfaces. The directional intra modes use data from neighboring prediction blocks that have been previously decoded from within the same picture.

Correspondingly, the inter motion information preferably represents motion vectors (MVs), such as horizontal and vertical MVs. HEVC allows for two MV modes, which are advanced motion vector prediction (AMVP) and merge mode. AMVP uses data from a reference picture and can also use data from adjacent prediction blocks. The merge mode allows for the MVs to be inherited from neighboring prediction blocks. The inter motion information may therefore also comprise information of the MV mode.

The prediction block is typically obtained, such as identified, based on either intra mode information or inter motion information derived by encoding the current picture. Thus, the current block is either intra encoded, in which case the prediction block is obtained based on intra mode information, or inter encoded, in which case the prediction block is obtained based on the inter motion information. However, in some cases it could be possible to combine intra and inter coding so that the prediction block is obtained based on both the intra mode information and the inter motion information.

In the implementation example shown in FIG. 4A, the first representation of the video sequence is a low quality or resolution representation of the video sequence and the second representation of the video sequence is a high quality or resolution representation of the video sequence. The high quality or resolution representation of the video sequence then has a higher quality or resolution as compared to the low quality or resolution representation of the video sequence. This is generally denoted top-down approach herein.

In another embodiment, the second representation of the video sequence has a lower quality or resolution as compared to the first representation of the video sequence. This is generally denoted bottom-up approach herein.

The two representations of the video sequence do not necessarily have to differ in terms of quality or resolution level. Generally, the two representations may differ in terms of picture resolution, frame rate, bit rate, codec profile or level, color space, chroma subsampling format and/or dynamic range.

Furthermore, the embodiments could be applied to scalable video coding (SVC) or multiview video coding (MVC). In SVC, video is encoded to produce a high-quality video bit stream that contains one or more subset bit streams that can themselves be decoded. A subset bit stream is derived by dropping packets from the larger bitstream. A subset bit stream can represent a lower spatial resolution (smaller screen), a lower temporal resolution (lower frame rate), and/or a lower quality video signal compared to the bit stream it is derived from. In temporal (frame rate) scalability, the motion compensation dependencies are structured so that complete pictures can be dropped from the bit stream. In spatial (picture size) scalability, video is coded at multiple spatial resolutions. The data and decoded samples of lower resolutions can be used to predict data or samples of higher resolutions in order to reduce the bit rate to code the higher resolutions. In signal-to-noise ratio (SNR)/quality/fidelity scalability, the video is coded at a single spatial resolution but at different qualities. The data and decoded samples of lower qualities can be used to predict data or samples of higher qualities in order to reduce the bit rate to code the higher qualities. SVC encoded a base layer and then one or more enhancement layers in order to obtain the scalability.

MVC is a stereoscopic video coding standard for video compression that allows for the efficient encoding of video sequences captured simultaneously from multiple camera angles in a single video stream. In similarity to SVC, video is encoded as a base view and one or more additional views.

In such a context, the first and second representations of the video could represent different layers in SVC or different views in MVC. For instance and when applied to SVC, the delta quantized coefficients encoded in step S6 could represent quantized coefficients of a pixel block in a picture in an enhancement layer and the estimated quantized coefficients can be quantized coefficients from a co-located pixel block in a picture from a reference layer, i.e. the base layer or an enhancement layer at lower resolution or quality. Correspondingly for MVC, the delta quantized coefficients encoded in step S6 could represent quantized coefficients of a pixel block in a picture in one view and the estimated quantized coefficients can be quantized coefficients from a co-located pixel block in a picture from a reference view, e.g. the base view.

Furthermore, the embodiments could be applied to general video coding where the estimated quantized coefficients are derived from application of a transform and quantization directly on the intra and/or inter prediction of the first representation, i.e. prediction block, or alternatively on the difference between a displaced version of an intra and/or inter prediction, i.e. displaced prediction block, and the intra and/or inter prediction, i.e. prediction block, according to intra and/or intra prediction mode parameters. In this context the delta quantized coefficients could correspond to the actual coefficients of the first representation or a difference between the actual coefficients and the estimated coefficients.

Figure 6:
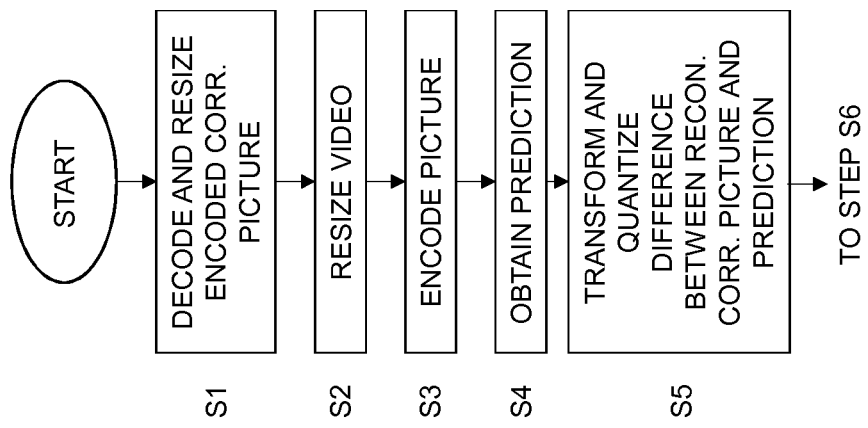
FIG. 6 is a flow chart illustrating additional, optional steps of the method shown in FIG. 6.

FIG. 6 is a flow chart illustrating additional optional steps of the method shown in FIG. 5. The method starts in step S1, which comprises decoding and resizing an encoded version of the corresponding picture in the second representation of the video sequence to obtain the reconstructed block of the corresponding picture in the second representation of the video sequence. The method also comprises resizing the video sequence to obtain the first representation of the video sequence in step S2. The picture in the first representation of the video is encoded in step S3 to obtain the intra mode information and/or inter motion information and the actual quantized coefficients. The following step S4 comprises obtaining the prediction block based on the intra mode information or the inter motion information. Step S5 comprises transforming and quantizing a difference between the reconstructed block of the corresponding picture in the second representation and the prediction block to obtain the estimated quantized coefficients. The method then continues to step S6 in FIG. 5, where the delta quantized coefficients representing the difference between the actual quantized coefficients from step S3 and the estimated quantized coefficients from step S5 are encoded based on information derived from the estimated quantized coefficients.

The resizing performed in step S1 and step S2 preferably result in a respective representation of the video sequence having a same bit rate and/or quality level. The resizing in steps S1 and S2 is typically in the form of downsizing, downscaling or sub-sampling. Thus, the resizing then preferably involves reducing the bit rate and/or quality level. However, the embodiments could also apply to the case of resizing in terms of upsizing or upscaling.

The encoding of the picture in step S3 is preferably performed to obtain a bit stream, i.e. actual quantized coefficients, intra mode information and/or inter motion information, in conformity with a video coding standard, such as HEVC. The intra mode information and/or inter motion information generated for the pixel block in step S3 is then used to identify the prediction block in the current picture, in the case of intra mode information, or in another picture in the first representation of the video sequence, in the case of inter motion information. The identified prediction block is then used together with the reconstructed block from step S1 to calculate a difference that is transformed to obtain transform coefficients, which are then quantized. Alternatively, the difference, i.e. prediction pixel values, is quantized directly with no transformation. The quantized transform coefficients or quantized prediction pixel values from step S5 constitute the estimated quantized coefficients.

In an embodiment, step S6 of FIG. 5 comprises encoding a syntax element for the pixel block indicating whether a position of a non-zero delta quantized coefficient in the pixel block is predicted from a position of a non-zero estimated quantized coefficient in the pixel block or the position is encoded for the pixel block.

The syntax element preferably indicates that the position of the non-zero delta quantized coefficient in the pixel block can be determined, i.e. predicted, from the corresponding position of the non-zero estimated quantized coefficient in the pixel block. In such a case, the syntax element preferably has a first value, such as 0 or 1. However, if the position of the non-zero delta quantized coefficient in the pixel block is not predicted from the corresponding position of the non-zero estimated quantized coefficient, i.e. is encoded for the pixel block, then the syntax element preferably has a second, different value, such as 1 or 0. In such a case, the syntax element could be in the form of a flag assuming either the value of 0 or 1.

A non-zero quantized coefficient is also referred to as a significant quantized coefficient in the art. The position of the non-zero delta or estimated quantized coefficient is preferably the position of a predefined non-zero delta or estimated quantized coefficient in the pixel block. In an embodiment, the predefined non-zero delta or estimated quantized coefficient is the last non-zero delta or estimated quantized coefficient in the pixel block. In another embodiment, the predefined non-zero delta or estimated quantized coefficient is the first non-zero delta or estimated quantized coefficient in the pixel block. In a further embodiment, the syntax element could indicate whether the positions of both the first and last non-zero delta quantized coefficients are predicted from the positions of the first and last non-zero estimated quantized coefficients in the pixel block. In yet another embodiment, two syntax elements are encoded in step S6, one relating to the last non-zero delta and estimated quantized coefficients and another relating to the first non-zero delta and estimated quantized coefficients, i.e. basically a combination of the two first embodiments above.

In an embodiment, the syntax element could indicate that the position of the, preferably first and/or last, non-zero delta quantized coefficient in the pixel block is determined based on the position of the, preferably first and/or last, non-zero estimated quantized coefficient, i.e. is a function f(·) of that position: $position_{ATC}=f(position_{ETC})$. In this embodiment, the position of the non-zero delta quantized coefficient is thereby calculated using a defined function from the position of the non-zero estimated quantized coefficient.

In another embodiment, the syntax element could indicate that the position of the, preferably first and/or last, non-zero delta quantized coefficient in the pixel block is the same as the position of the, preferably first and/or last, non-zero estimated quantized coefficient in the pixel block. In this embodiment, step S6 preferably comprises encoding a flag for the pixel block indicating whether the position of the non-zero delta quantized coefficient in the pixel block is the same as the position of the non-zero estimated quantized coefficient in the pixel block or the position is encoded for the pixel block.

Traditionally, the position of the last significant coefficient, i.e. last non-zero coefficient, in a transform block (TB) is coded by explicitly signaling its (x, y) coordinates. This is achieved by the syntax elements last_signfficant_coeff_x_prefix, last_signfficant_coeff_y_prefix, last_significant_coeff_x_suffix and last_significant_coeff_y_suffix, see section IV. Last significant coefficient, B. Last significant coefficient coordinates signaling on pages 1768-1769 in [2].

In an embodiment, the syntax element encoded in step S6 indicates whether the position of the last non-zero delta quantized coefficient in the pixel block is predicted from the position of the last non-zero estimated quantized coefficient in the pixel block, preferably as represented by the syntax elements last_signfficant_coeff_x_prefix, last_signfficant_coeff_y_prefix, last_signfficant_coeff_x_suffix and last_significant_coeff_y_suffix. In a particular embodiment, the x and y coordinates of the last non-zero delta quantized coefficient in the pixel block are calculated as a defined function of these syntax elements, such as f(last_significant_coeff_x_prefix), f(last_signfficant_coeff_y_prefix), f(last_significant_coeff_x_suffix) and f(last_significant_coeff_y_suffix) or f(last_significant_coeff_x_prefix, last_significant_coeff_y_prefix, last_significant_coeff_x_ suffix, last_significant_coeff_y_suffix). In another particular embodiment, the x and y coordinates of the last non-zero delta quantized coefficient in the pixel block are the same as the x and y coordinates of the last non-zero estimated quantized coefficient. This means that the syntax elements last_significant_coeff_x_prefix, last_significant_coeff_y_prefix, last_significant_coeff_x_suffix and last_significant_coeff_y_suffix for the last non-zero estimated quantized coefficient could be reused when determining the position of the last non-zero delta quantized coefficient.

In both these particular embodiments, there is no need to signal the syntax elements last_significant_coeff_x_prefix, last_significant_coeff_y_prefix, last_significant_coeff_x_suffix and last_significant_coeff_y_suffix for the last non-zero delta quantized coefficient if the syntax element, such as flag, indicates that the position of the last non-zero delta quantized coefficient is predicted from the position of the last non-zero estimated quantized coefficient. This thereby reduces the amount of data for encoding the delta quantized coefficients of the pixel block.

However, if the position of the last non-zero delta quantized coefficient in the pixel block is not predicted from the position of the last non-zero estimated quantized coefficient, then the above mentioned prefix and suffix syntax elements are preferably encoded in the bit stream for the delta quantized coefficients.

A position in a 2D matrix, such as. a pixel block, can be defined by its (x, y) coordinate as in HEVC or by its position along a 1D scan covering all (x, y) positions of the pixel block. For example position (x, y)=(3, 1) could be indicated as x=3 and y=1 as in HEVC or 7 considering a horizontal scanning from (x, y)=(0, 0) . . . (1, 0) . . . (3, 0) . . . (0, 1) . . . (3,1). The embodiments are also applicable to such a case where the position of a non-zero delta quantized coefficient in the pixel block is indicated by its position along a 1D scan.

In an embodiment, step S6 comprises encoding a syntax element representing a difference in a position of a, preferably last and/or first, non-zero delta quantized coefficient in the pixel block and a position of a, preferably last and/or first, non-zero estimated quantized coefficient in the pixel block.

This embodiment enables coding the position of the last and/or first non-zero delta quantized coefficient also when there is a difference between the actual position of the last and/or first non-zero delta quantized coefficient and the position of the last and/or first estimated quantized coefficient.

One way to implement this is to only consider cases, where the last non-zero delta quantized coefficient is closer to the DC coefficient than the position of the last non-zero estimated quantized coefficient relative to the DC coefficient. Then significance flags can be encoded that are zero until the last non-zero delta coefficient position is reached. Thus, in this case the syntax element is encoded in step S6 if $|position_{last_\Delta TC} - position_{DC}| < |position_{lastETC} - position_{DC}|$.

In an implementation example, a flag is encoded to indicate that the position of the last non-zero delta quantized coefficient is identical to the position of the last non-zero estimated quantized coefficient. When the positions are identical the flag is 1 and otherwise 0. In the case the positions are identical only the flag needs to be decoded to determine the position of the last non-significant delta quantized coefficient.

In another implementation example, a flag is encoded to indicate that the position of the last non-zero delta quantized coefficient is predicted from the last non-zero estimated quantized coefficient. If the flag is 1 prediction is used and if it is 0 no prediction is used and the position of the last non-zero delta quantized coefficients is encoded as in state of the art.

In other implementation examples, the flag instead relates to the position of the first non-zero delta quantized coefficient.

In an embodiment applicable to the embodiments mentioned above with regard to syntax element, such as flag, relating to the position of a non-zero delta quantized coefficient, step S6 of FIG. 5 preferably also comprises encoding the number of non-zero delta quantized coefficients in the pixel block.

In a related embodiment, the number of non-zero delta quantized coefficients in a sub-block, typically a 4×4 sub-block, of the pixel block could be encoded. Thus, embodiments as disclosed herein and relating to encoding and decoding the number of non-zero delta quantized coefficients in the pixel block also relate to encoding and decoding the number of non-zero delta quantized coefficients in a sub-block of the pixel block.

Using information from the estimated quantized coefficients to encode delta quantized coefficients may give a dependency on the encoding and thereby decoding of delta quantized coefficients so that the decoding is required to be performed after estimated quantized coefficients have been generated.

One variant to avoid that dependency is to encode the number of non-zero delta quantized coefficients that are encoded for the pixel block or the sub-block. In such an embodiment, a decoder can decode significance flags until the given number of non-zero delta quantized coefficients have been decoded. Then the magnitude and sign for these non-zero delta quantized coefficients can be decoded.

Another variant to avoid dependency is to encode an adjusted or temporary last non-zero, i.e. significant, delta quantized coefficient position that determines the last non-zero delta quantized coefficient to encode. In such an embodiment, a decoder can decode significance flags for scan positions below the adjusted position of the last significant delta coefficient. Then the magnitude and sign for these non-zero delta quantized coefficients can be decoded.

Figure 7:
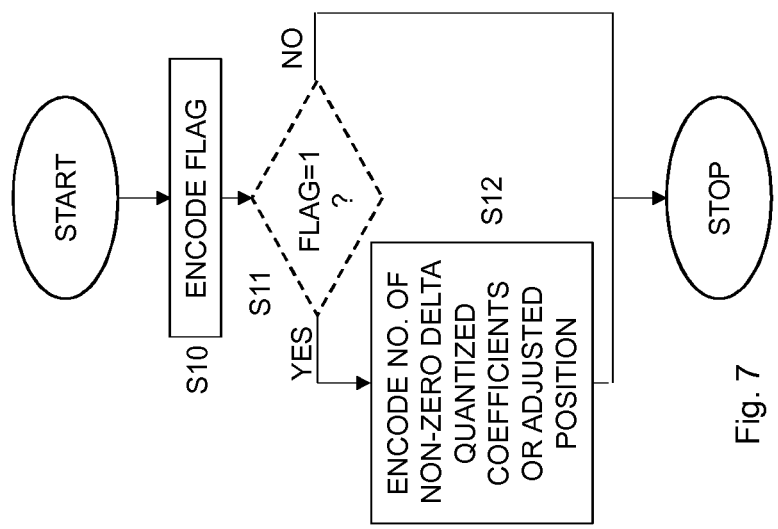
FIG. 7 is a flow chart illustrating a quantized coefficient encoding method according to another embodiment.

A variant to avoid such a dependency is shown in FIG. 7. This embodiment comprises encoding, in step S10, a flag indicating whether information derived from the estimated quantized coefficients is used to encode the delta quantized coefficients. The method also comprises encoding in step S12 and if the flag indicates that information derived from the estimated quantized coefficients is used to encode the delta quantized coefficients the number of non-zero delta quantized coefficients in the pixel block or in a sub-block of the pixel block In an alternative embodiment, step S12 of FIG. 7 comprises encoding, if the flag indicates that information derived from the estimated quantized coefficients is used to encode the delta quantized coefficients, an adjusted position of a last non-zero delta quantized coefficient in the pixel block or in a sub-block in the pixel block.

The method optionally comprises step S11 as shown in FIG. 7. Thus, if the flag is set to 1 then the method continues to step S12, in which the number of non-zero delta quantized coefficients is encoded or the adjusted position of the last non-zero delta quantized coefficient is encoded. However, if the flag is not set to 1, i.e. set to 0, there is no need to encode this number of non-zero delta quantized coefficients or encode the adjusted position of the last non-zero delta quantized coefficient since there is no risk of any dependency since no information derived from the estimated quantized coefficients is used when encoding the delta quantized coefficients.

The embodiments described above and further disclosed herein relating to encoding and decoding an adjusted position of the last non-zero delta quantized coefficient in a pixel block also encompass encoding and decoding an adjusted position of a last non-zero delta quantized coefficient in a sub-block, typically a 4×4 sub-block, of the pixel block.

In a particular embodiment, step S10 of FIG. 7 comprises encoding a flag indicating whether a position of a, preferably last and/or first, non-zero delta quantized coefficient in the pixel block is the same as a position of, preferably last and/or first, non-zero estimated quantized coefficient in the pixel block or the position is encoded for the pixel block.

If the pixel block comprises more than 4×4 positions and thereby more than 16 delta quantized coefficients, then the pixel block is preferably divided into 4×4 sub-blocks, sometimes referred to as a coefficient group (CG). In similarity to the embodiments above describing how the position of the last and/or first non-zero delta quantized coefficient can be predicted from the position of the last and/or first non-zero estimated quantized coefficient, the position within the pixel block of the sub-block comprising the last and/or first non-zero delta quantized coefficient in the pixel block could be predicted from the position of the sub-block comprising the last and/or first estimated quantized coefficient.

In another embodiment, step S10 of FIG. 7 comprises encoding a flag indicating whether information derived from the estimated quantized coefficient is used to encode the delta quantized coefficients. In this embodiment step S12 comprises encoding, if the flag indicates that information derived from the estimated quantized coefficients is used to encode the delta quantized coefficients, the number of sub-blocks with non-zero delta quantized coefficients in the pixel block.

In an embodiment, step S10 of FIG. 7 comprises encoding a flag indicating whether a position of a last and/or first sub-block with non-zero delta quantized coefficient in the pixel block is the same as a position of a last and/or first sub-block with non-zero estimated quantized coefficient in the pixel block or the position is encoded for the pixel block.

Using information from estimated quantized coefficients to encode delta quantized coefficients may give a dependency on encoding and thereby decoding of delta quantized coefficients so that the decoding is required to be performed after estimated quantized coefficients have been generated. One variant to avoid that dependency is to encode a flag that indicates that information from estimated quantized coefficients are used if the flag is 1 and indicates that no information from estimated quantized coefficients are used when the flag is 0. When the flag is 1 also the number of sub-blocks with non-zero delta quantized coefficients is encoded or an adjusted position for the last non-zero (significant) sub-block is encoded. Thus, a decoder can decode significant sub-blocks, i.e. sub-blocks with non-zero delta quantized coefficients, until the given number of sub-blocks with non-zero delta coefficients have been decoded or until the first adjusted sub-block position has been decoded. Then sub-block processing can continue with decoding of the positions of the non-zero delta quantized coefficients within the sub-block and the magnitude and sign of the non-zero delta quantized coefficients. Another variant to avoid the dependency is to directly encode the number of sub-blocks with non-zero delta coefficients. At the decoder, the significant sub-block flags can be decoded until all sub-blocks of non-zero delta coefficient significant flags have been decoded.

A pixel block with quantized coefficients is scanned in a so-called scanning pattern. The scanning pattern thereby defines the order at which positions within the pixel block are processed. In HEVC, there are different scanning patterns available. 4×4 pixel blocks are generally scanned in a diagonal scan. In the case of larger pixel blocks, the scan pattern is typically a diagonal scan of the 4×4 sub-blocks and a diagonal scan within each of the 4×4 sub-blocks. However, horizontal and vertical scans may also be applied in pixel blocks predicted according some intra prediction modes and having a size of 4×4 or 8×8. More information of scanning patterns can be found in section III. Scans, A. Scan Patterns on page 1767 in [2].

In an embodiment, step S6 of FIG. 5 comprises encoding a syntax element for the pixel block indicating whether to use an adjusted scanning pattern determined based on the estimated quantized coefficients or a default scanning pattern is used to define a processing order of delta quantized coefficients in the pixel block.

Hence, in this embodiment the syntax element defines whether to use the default scanning pattern, such as diagonal, horizontal or vertical scanning pattern as mentioned above, or whether to use an adjusted scanning pattern. If the adjusted scanning pattern is to be used as indicated by the syntax element then this adjusted scanning pattern is determined based on the estimated quantized coefficients.

In an embodiment, step S6 comprises encoding a syntax element for the pixel block indicating whether to use an adjusted scanning pattern defining first processing of delta quantized coefficients occupying positions in the pixel block corresponding to positions of non-zero estimated quantized coefficients in the pixel block followed by processing delta quantized coefficients occupying remaining positions in the pixel block or use the default scanning pattern.

Thus, in this embodiment the adjusted scanning pattern thereby defines start processing the delta quantized coefficients occupying the positions carrying non-zero estimated quantized coefficients. Then the delta quantized coefficients occupying any remaining positions in the pixel block are processed.

In a particular embodiment, the adjusted scanning pattern defines first processing of delta quantized coefficients occupying positions in the pixel block corresponding to positions of non-zero estimated quantized coefficients in the pixel block followed by processing delta quantized coefficients occupying remaining positions in the pixel block according to the default scanning pattern.

FIGS. 19A-19C schematically illustrate such an embodiment. FIG. 19A illustrate the default scanning pattern of a pixel block with delta quantized coefficients. The numbers in the 4×4 pixel blocks in the figures indicate the processing order of the respective positions. In FIG. 19A the default diagonal scanning pattern is used. In the figures, gray positions contain non-zero quantized coefficients and the position with a ring indicates the last non-zero quantized coefficient. Encoding and decoding of the pixel block shown in FIG. 19A according to the default scanning pattern would start at the last non-zero delta quantized coefficient (position 7) and then proceeding according to the default scanning pattern towards the top left position, typically the DC position (position 0), i.e. positions 7, 6, 5, 4, 3, 2, 1 and 0.

FIG. 19B illustrates the estimated quantized coefficients for the pixel block. As is seen in FIG. 19B, positions 0, 7 and 8 contain non-zero estimated quantized coefficients and the last non-zero estimated quantized coefficient occupies position 8.

FIG. 19C illustrates the pixel block of FIG. 19A but applying an adjusted scanning pattern defined based on the positions of the non-zero estimated quantized coefficients in FIG. 19B. In this example, the positions 0, 7 and 8 are first processed in FIG. 19C since these positions correspond to positions in FIG. 19B containing non-zero estimated quantized coefficients. These positions are thereby renumbered 0, 1 and 2. Then the remaining positions are processed in the default scanning pattern, jumping over already processed positions, thereby resulting in the adjusted scanning pattern shown in FIG. 19C. The adjusted scan can then be positioned according to FIG. 19D, thus, enabling signaling of an adjusted position of the last non-zero delta quantized coefficient, which in this case would be equal to 1 since the non-zero delta quantized coefficients are at adjusted scan positions 0 and 1.

The processing, i.e. encoding, starts with the adjusted last non-zero delta quantized coefficient, i.e. position 1 in this example, and then proceeds according to the adjusted scanning pattern to position 0. Remaining positions in the pixel block are zero delta quantized coefficients. The adjusted scanning pattern thereby leads to a shorter scan path for non-zero delta quantized coefficients (positions 1, 0) as compared to using the default scanning pattern (positions 7, 6, 5, 4, 3, 2, 1, 0).

This approach could also or alternatively be applied to define the scanning pattern of sub-blocks. Thus, in an embodiment, step S6 comprises encoding a syntax element for the pixel block indicating whether an adjusted scanning pattern determined based on positions of sub-blocks with non-zero estimated quantized coefficients in the pixel block or a default scanning pattern is used to define a processing order of sub-blocks of delta quantized coefficients in the pixel block.

Generally, a significance flag for a quantized coefficient, i.e. a flag indicating whether the quantized coefficient is zero or non-zero, is coded using a context model for each coefficient between the last one in scanning order and the DC component. The context depends on the position of the quantized coefficient within the pixel block, so-called position-based context modeling, and sometimes also on the template of the significance of neighboring CGs in the pixel block, so-called template-based context modeling. This is further described in section V. Significance map, B. Coefficient significance on page 1770 in [2].

Figure 8:
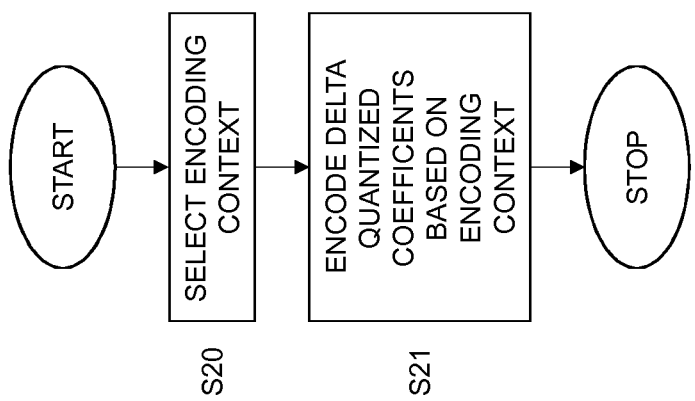
FIG. 8 is a flow chart illustrating a quantized coefficient encoding method according to a further embodiment.

FIG. 8 is a flow chart illustrating another embodiment of the quantized coefficient coding method. The method starts in step S20, which comprises selecting an encoding context for a non-zero delta quantized coefficient in the pixel block based on a magnitude of an estimated quantized coefficient occupying a corresponding position as the non-zero delta quantized coefficient occupies in the pixel block. In a following step S21, the non-zero delta quantized coefficient is encoded based on the selected encoding context.

Thus, in this embodiment the encoding context used for encoding non-zero delta quantized coefficients, preferably for encoding significance flags of such non-zero delta quantized coefficients, is selected based on information from the estimated quantized coefficients.

For instance, the context for encoding of the positions of the non-zero delta quantized coefficients is defined based on the positions of the non-zero estimated quantized coefficients. If an estimated quantized coefficient is non-zero one context is used for encoding the significance flag for corresponding delta quantized coefficient and if an estimated quantized coefficient is zero another context is used for coding a significance flag for corresponding delta quantized coefficient. This makes encoding of significance flags for delta quantized coefficients more efficient since there exists a correlation between significance flags of estimated quantized coefficients and significance flags of delta quantized coefficients.

This approach can also be used to define context for encoding sub-block positions of non-zero delta quantized coefficients based on positions of sub-blocks with non-zero estimated quantized coefficients. If a sub-block of the estimated quantized coefficients has at least one non-zero estimated quantized coefficient one context is used for coding the sub-block significance flag for corresponding sub-block flag for delta quantized coefficients and if a sub-block contains only zero estimated quantized coefficients another context is used for coding the corresponding sub-block flag for delta quantized coefficients. This makes coding of significance sub-block flags for delta coefficients more efficient since it exist a correlation between significance sub-block flags of estimated quantized coefficients and significance sub-block flags quantized of delta coefficients.

A variant of this is to encode a flag that indicates if encoding context is based on information from the estimated quantized coefficients. If the flag is 1, the encoding context is based on information from the estimated quantized coefficients and if it 0 it is not based on information from the estimated quantized coefficients.

In an embodiment, step S6 of FIG. 5 comprises encoding a syntax element for the pixel block indicating whether a significance map for the delta quantized coefficients is determined based on a significance map for the estimated quantized coefficients or the significance map for the delta quantized coefficients is determined independent on the significance map for the estimated quantized coefficients.

In a particular embodiment, the syntax element could be a flag indicating whether the significance map for the delta quantized coefficients is the same as the significance map for the estimated quantized coefficients or not. In the former case, there is no need to encode any significance map for the delta quantized coefficients. In clear contrast, merely a flag is used to denote that the significance map of the estimated quantized coefficients could be reused for the delta quantized coefficients.

It is possible to combine the previously described embodiments in various ways. For instance, the embodiments relating to encoding a syntax element indicating whether a position of a non-zero delta quantized coefficient in the pixel block is predicted from a position of a non-zero estimated quantized coefficient, the embodiments relating to encoding a syntax element representing a difference in a position of a non-zero delta quantized coefficient in the pixel block and a position of a non-zero estimated quantized coefficient, the embodiments relating to encoding a syntax element indicating whether a position of a sub-block of non-zero delta quantized coefficients in the pixel block is predicted from a position of a sub-block of non-zero estimated quantized coefficients, the embodiments relating to encoding a syntax element indicating whether an adjusted scanning pattern is used, the embodiments relating to selecting encoding context and/or the embodiments relating to encoding a syntax element indicating whether a significance map is determined based on information from the estimated quantized coefficients can be combined.

The above described embodiments of a quantized coefficient encoding method may advantageously be implemented in a delta quantized coefficient encoder (ΔTC encoder) as shown in FIG. 4A. Embodiments of a corresponding quantized coefficient decoding method may advantageously be implemented in a delta quantized coefficient decoder (ΔTC decoder) as shown in FIG. 4B.

Figure 9:
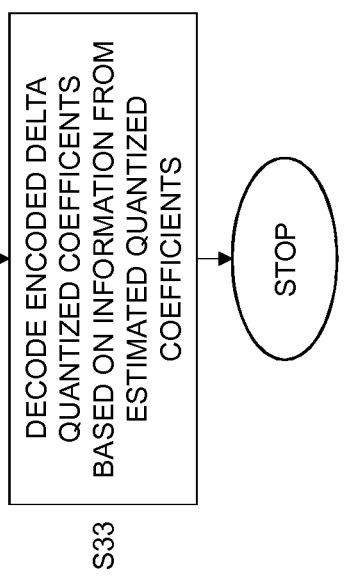
FIG. 9 is a flow chart illustrating a quantized coefficient decoding method according to an embodiment.

FIG. 9 is a flow chart of an embodiment of such a quantized coefficient decoding method. The method comprises decoding, in step S33, encoded delta quantized coefficients of a pixel block in a picture in a first representation of a video sequence based on information derived from estimated quantized coefficients for the pixel block to obtain delta quantized coefficients. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

Figure 10:
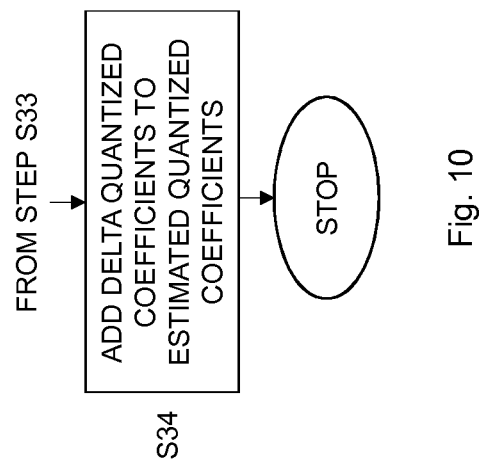
FIG. 10 is a flow chart illustrating an additional, optional step of the method shown in FIG. 9.

In an embodiment, the method of FIG. 9 comprises an additional steps S34 as shown in FIG. 10. This step S34 comprises adding the delta quantized coefficients to the estimated quantized coefficients to obtain the actual quantized coefficients.

Figure 11:
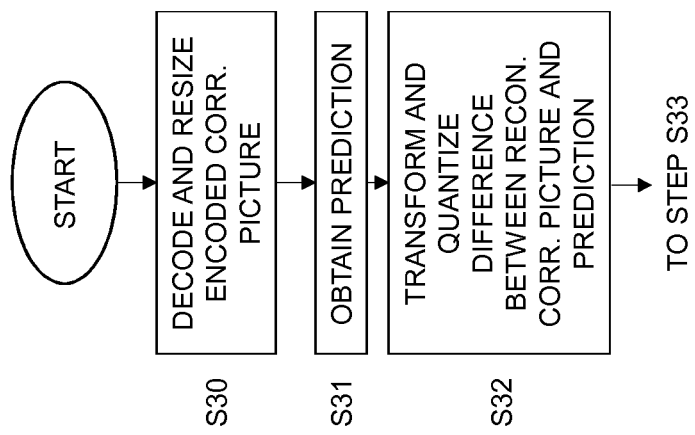
FIG. 11 is a flow chart illustrating additional, optional steps of the method shown in FIG. 9.

FIG. 11 is a flow chart illustrating additional steps of the method shown in FIG. 9 according to an embodiment. These steps comprise decoding and resizing, in step S30, an encoded version of the corresponding picture in the second representation of the video sequence to obtain the reconstructed block of the corresponding picture in the second representation of the video sequence. The prediction block is obtained in step S31 based on the intra mode information or the inter motion information. A following step S32 comprises transforming and quantizing a difference between the reconstructed block of the corresponding picture in the second representation and the prediction block to obtain the estimated quantized coefficients. The method then continues to step S33 in FIG. 9.

Figure 12:
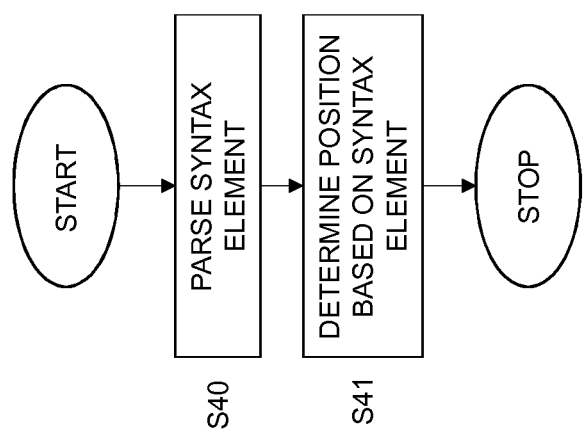
FIG. 12 is a flow chart illustrating a quantized coefficient decoding method according to another embodiment.

FIG. 12 is a flow chart illustrating another embodiment of the quantized coefficient decoding method. This embodiment comprises parsing, in step S40, a syntax element for the pixel block indicating whether a position of a, preferably last or first, non-zero delta quantized coefficient in the pixel block is predicted from a position of a, preferably last or first, non-zero estimated quantized coefficient in the pixel block or the position is decoded from the encoded delta quantized coefficients. A following step S41 then comprises determining the position of the non-zero delta quantized coefficient based on the syntax element. This step S41 is performed if the syntax element indicates that the position of the non-zero delta quantized coefficient is predicted from the position of the non-zero estimated quantized coefficient. Otherwise, the position is decoded from the encoded delta quantized coefficients, such as by decoding the previously mentioned last_signfficance_coeff_x_prefix, last_signfficance_coeff_y_prefix, last_signfficance_coeff_x_suffix and last_significance_coeff_y_suffix syntax elements and using them to calculate the coordinates of the last non-zero delta quantized coefficient in the pixel block.

In an embodiment, step S40 comprises parsing a flag for the pixel block indicating whether a position of the, preferably last or first, non-zero delta quantized coefficient in the pixel block is the same as the position of the, preferably last or first, non-zero estimated quantized coefficient in the pixel block or the position is decoded from the encoded delta quantized coefficients.

Figure 13:
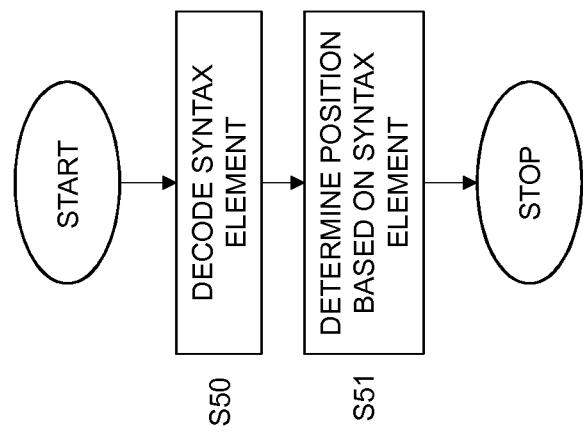
FIG. 13 is a flow chart illustrating a quantized coefficient decoding method according to a further embodiment.

FIG. 13 is a flow chart illustrating a further embodiment of the quantized coefficient decoding method. This embodiment comprises decoding, in step S50, a syntax element representing a difference in a position of a, preferably last or first, non-zero delta quantized coefficient in the pixel block and a position of a, preferably last or first, non-zero estimated quantized coefficient in the pixel block. The method also comprises determining, in step S51, the position of the non-zero delta quantized coefficient based on the syntax element and the position of the non-zero estimated quantized coefficient in the pixel block.

In an embodiment applicable to the embodiments shown in, among others, FIGS. 12 and 13, the method also comprises decoding a syntax element representing the number of non-zero delta quantized coefficients in the pixel block or in a sub-block of the pixel block. This embodiment thereby avoids any dependency of the decoding of the delta quantized coefficients on the decoding of the estimated quantized coefficients as previously described herein.

Another alternative to avoid dependency of decoding quantized coefficients is to decode an adjusted last significant delta coefficient position, which not directly refer to the actual position of the last significant, i.e. non-zero, delta quantized coefficient but rather to a position derived according to an adjusted scan of quantized coefficients. The delta quantized coefficients are decoded as if the adjusted position of the last non-zero delta quantized coefficient is the actual position of the last non-zero delta quantized coefficient. However the actual positioning is derived from the positions of the non-zero estimated quantized coefficients. The dependency is avoided since decoding of the delta quantized coefficients can be performed independently of the estimated quantized coefficients. The delta quantized coefficients can then be positioned after deriving an adjusted scan based on the positions of the non-zero estimated quantized coefficients, see FIG. 19C. To illustrate this we could define the positions of the adjusted scan in FIG. 19D that have the non-zero delta quantized coefficients in position 0 and 1 as in FIG. 19A.

Figure 14:
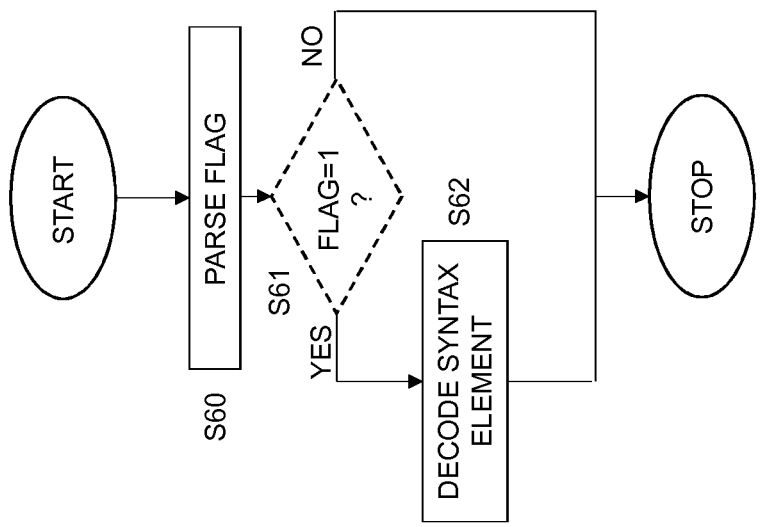
FIG. 14 is a flow chart illustrating a quantized coefficient decoding method according to yet another embodiment.

FIG. 14 is a flow chart illustrating yet another embodiment of the quantized coefficient decoding method. The method comprises parsing, in step S60, a flag indicating whether information derived from the estimated quantized coefficients is used to decode the encoded delta quantized coefficients. If the flag indicates that information derived from the estimated quantized coefficients is used to decode the encoded delta quantized coefficients as determined in the optional step S61, the method continues to step S62. This step S62 comprises decoding a syntax element representing the number of non-zero delta quantized coefficients in the pixel block or in a sub-block of the pixel block, or representing an adjusted position of the last non-zero delta quantized coefficient in the pixel block or in the sub-block of the pixel block.

Step S62 is omitted if the flag indicates that no information derived from the estimated quantized coefficients is needed to decode the delta quantized information. In such a case, there is no risk for any decoding dependencies and, hence, no need for the information of the number of non-zero delta quantized coefficients in the pixel block or in a sub-block of the pixel block, or the adjusted position of the last non-zero delta quantized coefficient in the pixel block or in the sub-block of the pixel block.

In an embodiment, step S60 comprises parsing a flag indicating whether a position of a, preferably first or last, non-zero delta quantized coefficient in the pixel block is the same as a position of a, preferably first or last, non-zero estimated quantized coefficient in the pixel block or the position is decoded from the encoded delta quantized coefficients.

In another embodiment, step S60 of FIG. 14 comprises parsing a flag indicating whether information derived from the estimated quantized coefficients is used to decode the encoded delta quantized coefficients. If the optional step S61 concludes that the flag indicates that information derived from the estimated quantized coefficients is used to decode the encoded delta quantized coefficients, a syntax element representing the number of sub-blocks with non-zero delta quantized coefficients in the pixel block is decoded or an adjusted position of the last non-zero sub-block is decoded in step S62.

In a particular embodiment step S60 then comprises parsing a flag indicating whether a position of a, preferably first or last, sub-block with non-zero delta quantized coefficient in the pixel block is the same as a position of a, preferably first or last, sub-block with non-zero estimated quantized coefficient in the pixel block or the position is decoded from the encoded delta quantized coefficients.

In an embodiment, step S33 of FIG. 9 comprises parsing a syntax element for the pixel block indicating whether an adjusted scanning pattern determined based on the estimated quantized coefficients or a default scanning pattern is used to define a processing order of the encoded delta quantized coefficients in the pixel block.

In a particular embodiment, this step S33 comprises parsing a syntax element for the pixel block indicating whether to use an adjusted scanning pattern defining first processing of encoded delta quantized coefficients occupying positions in the pixel block corresponding to positions of non-zero estimated quantized coefficients in the pixel block followed by processing encoded delta quantized coefficients occupying remaining positions in the pixel block or use the default scanning pattern.

In an embodiment, the adjusted scanning pattern defines first processing of encoded delta quantized coefficients occupying positions in the pixel block corresponding to positions of non-zero estimated quantized coefficients in the pixel block followed by processing encoded delta quantized coefficients occupying remaining positions in the pixel block according to the default scanning pattern.

In an embodiment, step S33 of FIG. 9 comprises parsing a syntax element for the pixel block indicating whether an adjusted scanning pattern determined based on positions of non-zero sub-blocks of estimated quantized coefficients in the pixel block or a default scanning pattern is used to define a processing order of sub-blocks of encoded delta quantized coefficients in the pixel block.

Figure 15:
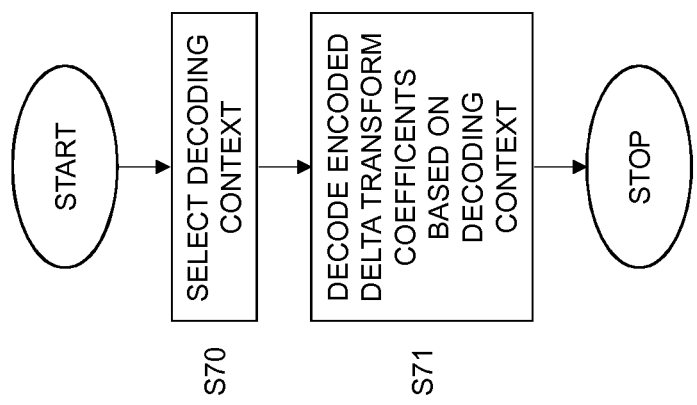
FIG. 15 is a flow chart illustrating a quantized coefficient decoding method according to a further embodiment.

FIG. 15 is a flow chart illustrating a further embodiment of the quantized coefficient decoding method. The method comprises selecting, in step S70, a decoding context for an encoded non-zero delta quantized coefficient in the pixel block based on a magnitude of an estimated quantized coefficient occupying a corresponding position as the non-zero delta quantized coefficient occupies in the pixel block. The method also comprises decoding, in step S71, the encoded non-zero delta quantized coefficient based on the selected decoding context.

Figure 16:
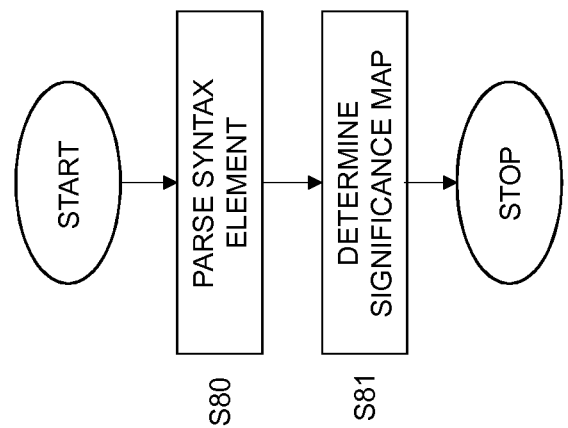
FIG. 16 is a flow chart illustrating a quantized coefficient decoding method according to a further embodiment.

FIG. 16 is a flow chart illustrating yet another embodiment of the quantized coefficient decoding method. The method comprises parsing, in step S80, a syntax element for the pixel block indicating whether a significance map for the delta quantized coefficients is determined based on a significance map for the estimated quantized coefficients. The method also comprises determining, in step S81 and if the syntax element indicates that the significance map for the delta quantized coefficients is determined based on the significance map for the estimated quantized coefficients, the significance map for the delta quantized coefficients based on the significance map for the estimated quantized coefficients.

Figure 17B:
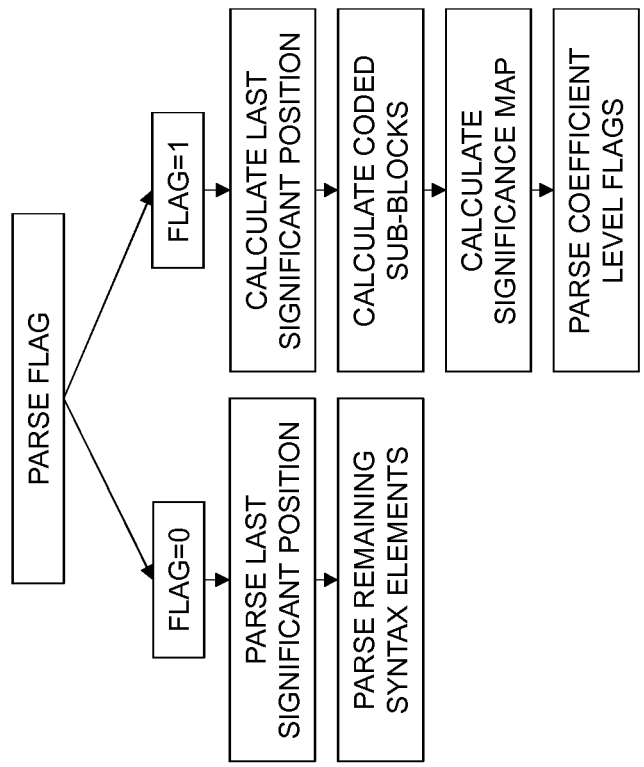
FIGS. 17A and 17B schematically represent encoding and parsing of significance map identical flag in connection with encoding and decoding delta quantized coefficients according to an embodiment.
Figure 17A:
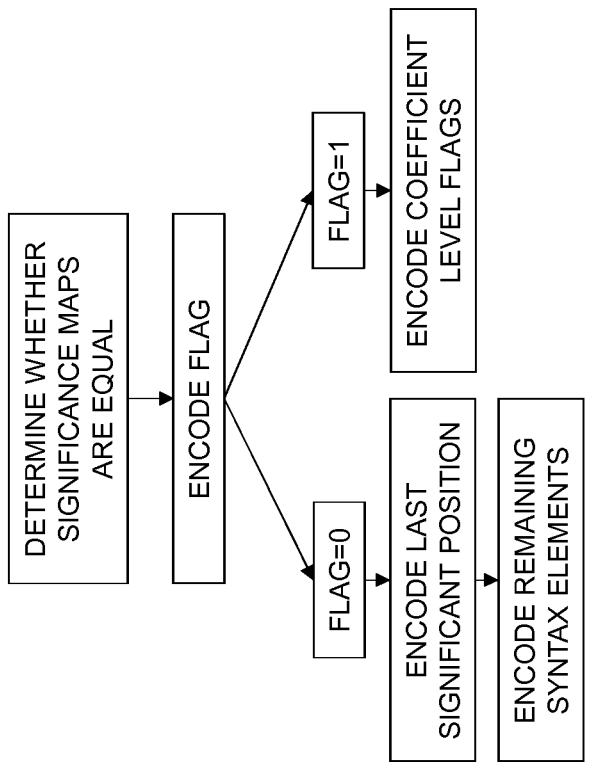

FIGS. 17A and 17B schematically represent encoding and parsing of significance map identical flag in connection with encoding and decoding delta quantized coefficients according to an embodiment.

The significance map takes up the most space in the coefficient encoding. Thus, improving the encoding of the significant coefficient map provides a large potential for improving the general performance of the encoding of delta quantized coefficients. In FIGS. 17A and 17B, a flag is used to signal that the significance maps for both estimated and delta quantized coefficients are identical. When the flag is set, it is not necessary to encode any of the last significant position (last_significance_coeff_x_prefix, last_signfficance_coeff_y_prefix, last_signfficance_coeff_x_suffix, last_significance_coeff_y_suffix), coded sub-block flags (coded_sub_block_flag) or the significance flags (significant_coeff_flag) for the delta quantized coefficients as these can be calculated from the estimated quantized coefficients. Especially in larger transformations this can take up a lot of bits. This flag is called SigMapIdentical herein.

During encoding and as shown in FIG. 17A, there is a determination or check whether the significance maps are identical or equal after the encoding. This is followed by writing this status bit, i.e. flag, into the bit stream. If it is set, the next bits written are the greater than 1 flags (coeff_abs_level_greater1_flag) from the last coded sub-block. In case the bits value is 0, the encoder continues with the last significant position, the coded sub-block flags, and so on in the normal encoding order.

During decoding and as shown in FIG. 17B, the flag is parsed and read out. If it is not set, the usual process continues, i.e. parsing last significant position and parsing remaining syntax elements. Otherwise the last significant position, coded sub-blocks, and significance map are calculated based on the estimated quantized coefficients. The next information parsed out of the bit stream is in this case the greater than 1 flags from the last coded sub-block.

The effect of this flag was evaluated for two similar cases: using it for all transformation sizes, and using it only for 32×32 transformations. The results are presented in Table 1 below.

Efficiency of the encoding is represent herein as the bit rate. Bit rate is directly based on the file size, a smaller file resulting in a lower bit rate, indicating a higher efficiency. The tables below show the difference to the original file, so a value of, for instance, 30% means that the file takes up 30% less space or the bit rate is 30% lower.

TABLE 1

Bit rate savings using the SigMapIdentical flag

| Settings | SigMapIdentical | SigMapIdentical for 32 × 32 |
| --- | --- | --- |
| 22/22 720p | 33.16% | 33.24% |
| 22/24 720p | 33,86% | 33.92% |
| 22/22 360p | 39.49% | 39.58% |
| 22/24 360p | 38.15% | 38.23% |
| 34/34 720p | 21.78% | 21.88% |
| 34/36 720p | 22.19% | 22.30% |
| 34/34 360p | 25.56% | 25.67% |
| 34/36 360p | 24.26% | 24.38% |
| 22/18 1080p | 14.00% | 14.08% |
| 34/30 1080p | 10.26% | 10.30% |
| Average Top-Down | 29.81% | 29.90% |
| Average Bottom-Up | 12.13% | 12.19% |

In Table 1 and the following tables, Top-Down indicates that the first representation of the video sequence is of lower quality than the second representation of the video sequence as shown in FIGS. 4A and 4B. In Bottom-Up, the first representation of the video sequence is instead of a higher quality than the second representation of the video sequence. XX/YY ZZZp indicates quantization parameter (QP) used for the encoding of the original video (XX), QP used for encoding of the first representation of the video sequence (YY) and ZZZp represents the resolution, i.e. the height of each frame in the video sequence. The results in the tables are obtained using the video sequences BasketballDrive, BQTerrace, Cactus, Kimono and ParkScene.

Figures 18A, 18B:
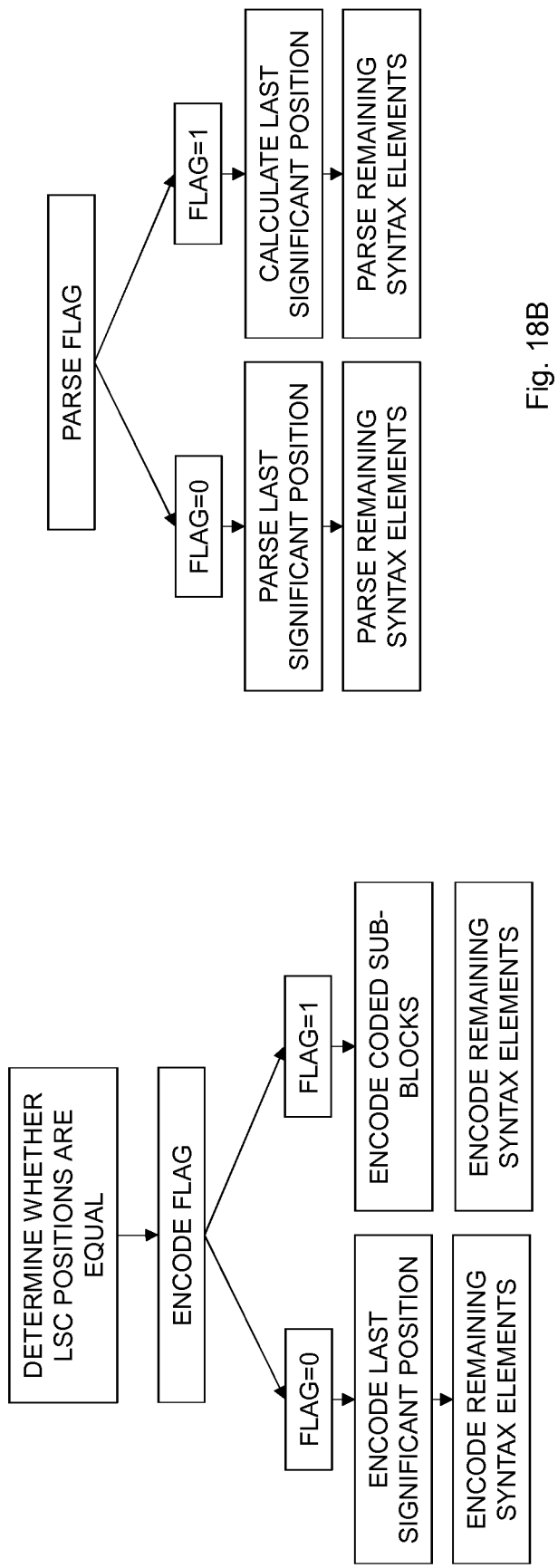
FIGS. 18A and 18B schematically represent encoding and parsing of last significant coefficient flag in connection with encoding and decoding delta quantized coefficients according to an embodiment.

FIGS. 18A and 18B schematically represent encoding and parsing of last significant coefficient flag in connection with encoding and decoding delta quantized coefficients according to an embodiment.

Experimental data indicates that it is fairly common that the last significant position is identical for both the estimated and delta quantized coefficients. The process of encoding this flag, denoted LscIdentical herein, is shown in FIG. 18A. During encoding, it is determined whether the last significant coefficient (LSC) position among the delta quantized coefficients is the same as the LSC position among the estimated quantized coefficients. If these are identical the LscIdentical flag is set to 1, otherwise it remains at its initial value of 0. This flag is preferably encoded right before the position is written into the bit stream. If the flag is set, the position is skipped, i.e. there is no need to include the prefix and suffix syntax elements defining this position. Afterwards the encoder continues with the coded sub-block flags and the remaining syntax elements.

During decoding, when the parser tries to read out the last significant position, it first reads the LscIdentical flag from the bit stream. If it is set, the last significant position is determined from the estimated quantized coefficients. The next step is then to parse the coded sub-block flags and the significance map. Otherwise it parses the last significant position from the bit stream and then continues with the ordinary parsing process.

If this flag is used in combination with the SigMapIdentical flag (FIGS. 17A and 17B), this flag is skipped whenever the SigMapIdentical flag is set.

In a simulation test, the LscIdentical flag was implemented for two different cases. In the first case it was used for all transformation sizes, in the second case only for transformations larger than 4×4.

TABLE 2

Bit rate savings using the LscIdentical flag

| Settings | LscIdentical | LscIdentical for ≥8 × 8 |
|---|---|---|
| 22/22 720p | 34.09% | 34.07% |
| 22/24 720p | 34.93% | 34.90% |
| 22/22 360p | 40.16% | 40.14% |
| 22/24 360p | 38.94% | 38.90% |
| 34/34 720p | 22.82% | 22.88% |
| 34/36 720p | 23.18% | 23.25% |
| 34/34 360p | 26.52% | 26.55% |
| 34/36 360p | 25.21% | 25.26% |
| 22/18 1080p | 14.40% | 14.50% |
| 34/30 1080p | 11.40% | 11.50% |
| Average Top-Down | 30.73% | 30.74% |
| Average Bottom-Up | 12.90% | 13.00% | scheme with four contexts for luma and chroma each, using the magnitude of the estimated quantized coefficient as a switch. Here the following separation was made:

context 0 ← magnitude estimated quantized coefficient=0
context 1 ← magnitude estimated quantized coefficient=1 or 2
context 2 ← magnitude estimated quantized coefficient>2 and <8
context 3 ← magnitude estimated quantized coefficient≥8

A third change of the contexts was made based on a combination of the original variant based on the position and the magnitude of the estimated quantized coefficient. This resulted in six used contexts for luma and four for chroma. A map was used to switch the context based on the positions. The maps are shown below for luma and chroma, respectively.

| Map for luma | | | |
|---|---|---|---|
| 1 | 2 | 3 | 4 |
| 2 | 3 | 4 | 5 |
| 3 | 4 | 5 | 5 |
| 4 | 5 | 5 | 5 |

| Map for chroma | | | |
|---|---|---|---|
| 1 | 2 | 2 | 2 |
| 2 | 2 | 3 | 3 |
| 2 | 3 | 3 | 3 |
| 3 | 3 | 3 | 3 |

These maps were used for all coefficients in the top-left sub-block. Coefficients in other sub-blocks were assigned to context 5 or 3, respectively. Context 0 was used for all coefficients, which had an insignificant magnitude in the estimated coefficients.

The results of varying the CABAC contexts are presented in Table 3.

| Settings | 1/1 ctx | 2/2 ctx | 4/4 ctx | 6/4 ctx | 28/16 ctx | 54/30 ctx |
|---|---|---|---|---|---|---|
| 22/22 720p | 32.72% | 33.13% | 33.15% | 33.14% | 33.11% | 33.79% |
| 22/24 720p | 33.48% | 34.00% | 34.02% | 34.02% | 22.96% | 34.53% |
| 22/22 360p | 39.39% | 39.78% | 39.79% | 39.79% | 39.63% | 39.94% |
| 22/24 360p | 38.10% | 38.57% | 38.58% | 38.57% | 38.37% | 38.61% |
| 34/34 720p | 21.48% | 21.95% | 21.94% | 21.92% | 21.81% | 22.34% |
| 34/36 720p | 22.04% | 22.42% | 22.41% | 22.39% | 22.24% | 22.67% |
| 34/34 360p | 25.74% | 26.17% | 26.16% | 26.15% | 25.76% | 25.90% |
| 34/36 360p | 24.54% | 24.89% | 24.89% | 24.87% | 24.40% | 24.51% |
| 22/18 1080p | 13.08% | 13.76% | 13.76% | 13.77% | 13.77% | 14.87% |
| 34/30 1080p | 8.97% | 10.32% | 10.32% | 10.30% | 10.29% | 11.54% |
| Average Top-Down | 29.69% | 30.11% | 30.12% | 30.11% | 29.91% | 30.29% |
| Average Bottom-Up | 11.02% | 12.04% | 12.04% | 12.04% | 12.03% | 13.20% |

In an embodiment, an attempt to improve the encoding of the significance map for the delta quantized coefficients was made by reducing the number of encoding contexts used. The original encoding uses a total of 42 contexts (27 for luma and 15 for chroma). Evaluations were made using four (two each for luma and chroma), eight (four each for luma and chroma) and ten contexts (six for luma and four for chroma). The context switches were based on the knowledge gained from the relation between the magnitude of estimated and delta quantized coefficients. In the case with two contexts each for luma and chroma the switch was made based on whether the estimated quantized coefficient in the identical position is zero. This was extended for the encoding In an implementation example, a decoding of a pixel block comprises decoding the adjusted position of the last non-zero delta quantized coefficient in a default implicitly defined scan order or pattern or in an explicitly defined scan order or pattern. Then, other syntax elements like 4×4 sub-blocks flags, significance flags, delta coefficient magnitudes and signs are decoded with respect to this adjusted position of the last non-zero delta quantized coefficient. Now all non-zero delta quantized coefficients have a sign and a magnitude. The decoding can consist of arithmetic decoding, for example CABAC, or variable length decoding (VLC).

After decoding coding mode of current pixel block and identifying a prediction block, estimated quantized coefficients can be produced. The decoded delta quantized coefficients can then be positioned using information from the estimated quantized coefficients. In case the pixel block is larger than 4×4, the positions of the 4×4 sub-blocks with non-zero estimated quantized coefficients are positioned according to a sub-block scan with lowest scan positions and the other 4×4 sub-blocks are given a higher scan positions according to a default scanning path through the 4×4 sub-blocks. If the number of 4×4 sub-blocks with non-zero delta coefficients is 1, the scan position 0 (or (0, 0) in (x, y)-scan like in HEVC) corresponds to the first 4×4 sub-block with non-zero estimated quantized coefficients. This could correspond to delta coefficient sub-block position 1 if there are no non-zero estimated quantized coefficients in sub-block 0 of the estimated quantized coefficients. If this 4×4 sub-block is the last 4×4 sub-block according to the 4×4 sub-block scan (sub-block x in 1D scan or sub-block (x, y) as in HEVC) the adjusted position of the last non-zero delta quantized coefficient is at a specific scan position inside this 4×4 sub-block. Then, the first adjusted scan position in this 4×4 sub-block corresponds to the position of the first non-zero estimated quantized coefficient in the default scan and the second scan position corresponds to the position of the second non-zero estimated quantized coefficient in the default scan and so on until all positions of non-zero estimated quantized coefficients have been processed. The processing then continues with the other scan positions in the default scanning pattern. Then, if, for instance, the adjusted position of the last non-zero delta quantized coefficient is at scan position 1 as in FIG. 19D for this 4×4 sub-block this corresponds to the second non-zero estimated quantized coefficient, which corresponds to estimated position 7 in FIG. 19B. Thus, we know that the second non-zero delta quantized coefficient is at position 7. Then, if the significance flag corresponding to adjusted position 0 is 1 this indicates that the delta quantized coefficient at adjusted position 0 is non-zero and that position corresponds to estimated position 0. Thus, we know that the first non-zero delta quantized coefficient is at position 0 of that 4×4 sub-block. In this case, there is a high correlation between the position of the non-zero estimated quantized coefficients and the non-zero delta quantized coefficients and the scan is short. If this 4×4 sub-block not is the last 4×4 sub-block according to the 4×4 sub-block scan, the decoded significance flags indicate directly the delta quantized coefficient position.

In a further implementation example, a decoding of a pixel block comprises decoding the number of 4×4 sub-blocks with non-zero delta quantized coefficients. Then, for each 4×4 sub-block with non-zero delta quantized coefficients, the number of non-zero delta quantized coefficients is decoded. Then, the significance flags are decoded until same number of significance flags equal to 1 as the number of non-zero delta quantized coefficients have been decoded. Then, the magnitudes and signs for the non-zero delta quantized coefficients are decoded. Now all non-zero delta quantized coefficients have a sign and a magnitude. The decoding can consist of arithmetic decoding, for example CABAC, or variable length decoding (VLC).

After decoding coding mode of current pixel block and identifying a prediction block, estimated quantized coefficients can be produced. The decoded delta quantized coefficients can then be positioned using information from the estimated quantized coefficients. In case the pixel block is larger than 4×4, the positions of the 4×4 sub-blocks with non-zero estimated quantized coefficients are positioned according to a 1D sub-block scan with lowest scan positions and the other 4×4 sub-blocks are given a higher scan positions according to a default scanning path through the 4×4 sub-blocks. If the number of 4×4 sub-blocks with non-zero delta coefficients is 1, the scan position 0 corresponds to the first 4×4 sub-block with non-zero estimated coefficients. Then, if, for instance, the number of non-zero delta quantized coefficients for that sub-block is 2 that means that the 2 non-zero delta quantized coefficients are positioned at the scan positions with significance flag equal to 1 according to a scan pattern determined by the positions of the non-zero estimated quantized coefficients. The first scan position corresponds to the position of the first non-zero estimated quantized coefficient in the default scan and the second scan position corresponds to the position of the second non-zero estimated quantized coefficient in the default scan and so on until all positions of non-zero estimated quantized coefficients have been processed. The processing then continues with the other scan positions in the default scanning pattern.

In an implementation example with reference to FIGS. 19A-19D, a default scanning pattern is shown in FIG. 19A. In the default scanning pattern, the scanning starts at the position of the last non-zero delta quantized coefficient, in the example at number 7, and continues towards the top left position according the default up-right scanning pattern towards number 0. FIG. 19C shows how the scanning pattern is adjusted according to the positions of the non-zero estimated quantized coefficients. In the adjusted scanning pattern, the scan numbering starts at the first non-zero estimated quantized coefficient in default scan order (number 0) and continues in default scan order to the last non-zero estimated quantized coefficient in default scan order (number 2). The remaining positions are assigned in default scan order, jumping over already assigned positions. FIG. 19D shows the positioning of the adjusted scanning where the adjusted position of the last non-zero delta quantized coefficient position is 1.

Then to encode/decode the non-zero delta quantized coefficients, a significance flag is encoded/decoded for each scan position of the adjusted scanning pattern from the first scan position to the position just before the adjusted position of the last non-zero delta quantized coefficient, in case an adjusted position of the last non-zero delta quantized coefficient is signaled for that pixel block. In such a case, we know that that position has a non-zero coefficient so no flag is needed for that position. When there is a non-zero delta quantized coefficient at an adjusted scan position, either at the last position or a position for which the significance flag is equal to 1, that means that there exist a non-zero delta quantized coefficient at the corresponding delta quantized coefficient position. When the significance flag is 0 the corresponding position of the delta quantized coefficient is also zero. In the example shown in FIG. 19C, the position of the last non-zero delta quantized coefficient is at position 1, (corresponds to position 7 in the delta scanning pattern in FIG. 19 A), the first significance flag is also 1 (position 0 in the actual scanning pattern). If the number of non-zero delta quantized coefficients is given, for example has been encoded/decoded, no more significance flags needs to be encoded/decoded.

If the delta quantized coefficients are divided into 4×4 sub-blocks, the scanning of the 4×4 sub-blocks can be adjusted in a corresponding way. In this case a sub-block significance flag is encoded/decoded for each sub-block scan position. When the sub-block significance flag is 1 there is at least one non-zero delta quantized coefficient at that 4×4 sub-block and when the flag is 0 all delta quantized coefficients of that 4×4 sub-block are zero. The first sub-block significance flag is encoded/decoded starting at the first 4×4 sub-block in the adjusted scanning pattern and then continues to a last 4×4 sub-block in the adjusted scan (if that is known) or if the number of 4×4 sub-blocks is known, sub-block significance flags are encoded/decoded until the given number of non-zero 4×4 sub-blocks is reached.

If number of non-zero delta quantized coefficients are encoded/decoded and the number is same as the transform size, only significance flags for the first number minus 1 scan positions needs to be encoded/decoded. If the number of non-zero delta quantized coefficients is 1 no significance flag is needed to be encoded/decoded since that coefficient must always be non-zero. If an adjusted position of the last non-zero delta quantized coefficient is encoded/decoded only significance flags for lower scan positions inside the last sub-block needs to be encoded/decoded.

The various embodiments disclosed herein could also include consideration of the magnitude of a non-zero estimated quantized coefficient. The magnitude can be used as a certainty factor that decreases the importance of non-zero estimated quantized coefficients with small magnitude. For example, non-zero estimated quantized coefficients of small magnitude compared to an average non-zero estimated magnitude could be treated as noise and omitted in the consideration of other embodiments.

Another aspect of the embodiments relates to a guided transcoder configured to encode delta quantized coefficients of a pixel block in a picture in a first representation of a video sequence based on information derived from estimated quantized coefficients for the pixel block. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

In an embodiment, the guided transcoder is configured to decode and resize an encoded version of the corresponding picture in the second representation of the video sequence to obtain the reconstructed block of the corresponding picture in the second representation of the video sequence. The guided transcoder is also configured to resize the video sequence to obtain the first representation of the video sequence. The guided transcoder is further configured to encode the picture in the first representation of the video sequence to obtain the intra mode information or the inter motion information and the actual quantized coefficients. The guided transcoder is additionally configured to obtain the prediction block based on the intra mode information or the inter motion information. The guided transcoder is also configured to transform and quantize a difference between the reconstructed block of the corresponding picture in the second representation and the prediction block to obtain the estimated quantized coefficients.

In an embodiment, the guided transcoder is configured to encode a syntax element for the pixel block indicating whether a position of a non-zero delta quantized coefficient in the pixel block is predicted from a position of a non-zero estimated quantized coefficient in the pixel block or the position is encoded for the pixel block.

The guided transcoder is preferably also configured to encode a flag for the pixel block indicating whether the position of the non-zero delta quantized coefficient in the pixel block is the same as the position of the non-zero estimated quantized coefficient in the pixel block or the position is encoded for the pixel block.

Alternatively, the guided transcoder is configured to encode a syntax element representing a difference in a position of a non-zero delta quantized coefficient in the pixel block and a position of a non-zero estimated quantized coefficient in the pixel block.

The guided transcoder is preferably also configured to encode the number of non-zero delta quantized coefficients in the pixel block or in a sub-block of the pixel block, or encode an adjusted position of a last non-zero delta quantized coefficient in said pixel block or in the sub-block of the pixel block.

In an embodiment, the guided transcoder is configured to encode a flag indicating whether information derived from the estimated quantized coefficients is used to encode the delta quantized coefficients. The guided transcoder is also configured to encode, if the flag indicates that information derived from the estimated quantized coefficients is used to encode the delta quantized coefficients, the number of non-zero delta quantized coefficients in the pixel block or in a sub-block of the pixel block, or an adjusted position of a last non-zero delta quantized coefficient in said pixel block or in the sub-block of the pixel block.

The guided transcoder is in this embodiment preferably configured to encode a flag indicating whether a position of a, preferably first or last, non-zero delta quantized coefficient in the pixel block is the same as a position of a, preferably first or last, non-zero estimated quantized coefficient in the pixel block or the position is encoded for the pixel block.

In an embodiment, the guided transcoder is configured to encode a flag indicating whether information derived from the estimated quantized coefficients is used to encode the delta quantized coefficients. The guided transcoder is also configured to encode, if the flag indicates that information derived from the estimated quantized coefficients is used to encode the delta quantized coefficients, the number of sub-blocks with non-zero delta quantized coefficients in the pixel block or an adjusted position of a last non-zero sub-block.

The guided transcoder is in this embodiment preferably configured to encode a flag indicating whether a position of a, preferably first or last, sub-block with non-zero delta quantized coefficient in the pixel block is the same as a position of a, preferably first or last, sub-block with non-zero estimated quantized coefficient in the pixel block or the position is encoded for the pixel block.

In an embodiment, the guided transcoder is configured to encode a syntax element for the pixel block indicating whether an adjusted scanning pattern determined based on the estimated quantized coefficients or a default scanning pattern is used to define a processing order of delta quantized coefficients in the pixel block.

The guided transcoder is in this embodiment preferably configured to encode a syntax element for the pixel block indicating whether to use an adjusted scanning pattern defining first processing of delta quantized coefficients occupying positions in the pixel block corresponding to positions of non-zero estimated quantized coefficients in the pixel block followed by processing delta quantized coefficients occupying remaining positions in the pixel block or use the default scanning pattern.

In a particular embodiment, the guided transcoder is configured to encode a syntax element for the pixel block indicating whether to use an adjusted scanning pattern defining first processing of delta quantized coefficients occupying positions in the pixel block corresponding to positions of non-zero estimated quantized coefficients in the pixel block followed by processing delta quantized coefficients occupying remaining positions in the pixel block according to the default scanning pattern or use the default scanning pattern.

In an embodiment, the guided transcoder is configured to encode a syntax element for the pixel block indicating whether an adjusted scanning pattern determined based on positions of non-zero sub-blocks of estimated quantized coefficients in the pixel block or a default scanning pattern is used to define a processing order of sub-blocks of delta quantized coefficients in the pixel block.

In an embodiment, the guided transcoder is configured to select an encoding context for a non-zero delta quantized coefficient in the pixel block based on a magnitude of an estimated quantized coefficient occupying a corresponding position as the non-zero delta quantized coefficient occupies in the pixel block. The guided transcoder is also configured to encode the non-zero delta quantized coefficient based on the selected encoding context.

In an embodiment, the guided transcoder is configured to encode syntax element for the pixel block indicating whether a significance map for the delta quantized coefficients is determined based on a significance map for the estimated quantized coefficients or the significance map for the delta quantized coefficients is determined independent on the significance map for the estimated quantized coefficients.

A further aspect of the embodiments relates to a guided transcoder configured to decode encoded delta quantized coefficients of a pixel block in a picture in a first representation of a video sequence based on information derived from estimated quantized coefficients for the pixel block to obtain delta quantized coefficients. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

In an embodiment, the guided transcoder is configured to add the delta quantized coefficients to the estimated quantized coefficients to obtain the actual quantized coefficients.

In an embodiment, the guided transcoder is configured to decode and resize an encoded version of the corresponding picture in the second representation of the video sequence to obtain the reconstructed block of the corresponding picture in the second representation of the video sequence. The guided transcoder is also configured to obtain the prediction block based on the intra mode information or the inter motion information. The guided transcoder is further configured to transform and quantize a difference between the reconstructed block of the corresponding picture in the second representation and the prediction block to obtain the estimated quantized coefficients.

In an embodiment, the guided transcoder is configured to parse a syntax element for the pixel block indicating whether a position of a non-zero delta quantized coefficient in the pixel block is predicted from a position of a non-zero estimated quantized coefficient in the pixel block or the position is decoded from the encoded delta quantized coefficients. The guided transcoder is also configured to determine the position of the last non-zero delta quantized coefficient based on the syntax element.

The guided transcoder is preferably configured to parse a flag for the pixel block indicating whether a position of the non-zero delta quantized coefficient in the pixel block is the same as the position of the non-zero estimated quantized coefficient in the pixel block or the position is decoded from the encoded delta quantized coefficients.

In an embodiment, the guided transcoder is configured to decode a syntax element representing a difference in a position of a non-zero delta quantized coefficient in the pixel block and a position of a non-zero estimated quantized coefficient in the pixel block. The guided transcoder is also configured to determine the position of the non-zero delta quantized coefficient based on the syntax element and the position of the non-zero estimated quantized coefficient in the pixel block.

The guided transcoder is configured to decode a syntax element representing the number of non-zero delta quantized coefficients in the pixel block or in a sub-block of the pixel block, or representing an adjusted position of a last non-zero delta quantized coefficient in said pixel block or in the sub-block of the pixel block.

In an embodiment, the guided transcoder is configured to parse a flag indicating whether information derived from the estimated quantized coefficients is used to decode the encoded delta quantized coefficients. The guided transcoder is also configured to decode, if the flag indicates that information derived from the estimated quantized coefficients is used to decode the encoded delta quantized coefficients, a syntax element representing the number of non-zero delta quantized coefficients in the pixel block or in a sub-block of the pixel block, or representing an adjusted position of a last non-zero delta quantized coefficient in said pixel block or in the sub-block of the pixel block.

The guided transcoder is in this embodiment preferably configured to parse a flag indicating whether a position of a, preferably first or last, non-zero delta quantized coefficient in the pixel block is the same as a position of a, preferably first or last, non-zero estimated quantized coefficient in the pixel block or the position is decoded from the encoded delta quantized coefficients.

In an embodiment, the guided transcoder is configured to parse a flag indicating whether information derived from the estimated quantized coefficients is used to decode the encoded delta quantized coefficients. The guided transcoder is also configured to decode, if the flag indicates that information derived from the estimated quantized coefficients is used to decode the encoded delta quantized coefficients, a syntax element representing the number of sub-blocks with non-zero delta quantized coefficients in the pixel block or in a sub-block of the pixel block, or representing an adjusted position of a last non-zero sub-block or in the sub-block of the pixel block.

The guided transcoder is in this embodiment preferably configured to parse a flag indicating whether a position of a, preferably first or last, sub-block with non-zero delta quantized coefficient in the pixel block is the same as a position of a, preferably first or last, sub-block with non-zero estimated quantized coefficient in the pixel block or the position is decoded from the encoded delta quantized coefficients.

In an embodiment, the guided transcoder is configured to parse a syntax element for the pixel block indicating whether an adjusted scanning pattern determined based on the estimated quantized coefficients or a default scanning pattern is used to define a processing order of the encoded delta quantized coefficients in the pixel block.

The guided transcoder is in this embodiment preferably configured to parse a syntax element for the pixel block indicating whether to use an adjusted scanning pattern defining first processing of encoded delta quantized coefficients occupying positions in the pixel block corresponding to positions of non-zero estimated quantized coefficients in the pixel block followed by processing encoded delta quantized coefficients occupying remaining positions in the pixel block or use the default scanning pattern.

The guided transcoder is in this embodiment preferably configured to parse a syntax element for the pixel block indicating whether to use an adjusted scanning pattern defining first processing of encoded delta quantized coefficients occupying positions in the pixel block corresponding to positions of non-zero estimated quantized coefficients in the pixel block followed by processing encoded delta quantized coefficients occupying remaining positions in the pixel block according to the default scanning pattern or use the default scanning pattern.

In an embodiment, the guided transcoder is configured to parse a syntax element for the pixel block indicating whether an adjusted scanning pattern determined based on positions of non-zero sub-blocks of estimated quantized coefficients in the pixel block or a default scanning pattern is used to define a processing order of sub-blocks of encoded delta quantized coefficients in the pixel block.

In an embodiment, the guided transcoder is configured to select a decoding context for an encoded non-zero delta quantized coefficient in the pixel block based on a magnitude of an estimated quantized coefficient occupying a corresponding position as the non-zero delta quantized coefficient occupies in the pixel block. The guided transcoder is also configured to decode the encoded non-zero delta quantized coefficient based on the selected decoding context.

In an embodiment, the guided transcoder is configured to parse a syntax element for the pixel block indicating whether a significance map for the delta quantized coefficients is determined based on a significance map for the estimated quantized coefficients. The guided transcoder is also configured to determine, if the syntax element indicates that the significance map for the delta quantized coefficients is determined based on the significance map for the estimated quantized coefficients, the significance map for the delta quantized coefficients based on the significance map for the estimated quantized coefficients.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

FIG. 20 is a schematic block diagram illustrating an example of a guided transcoder 100, based on a processor-memory implementation according to an embodiment. In this particular example, the guided transcoder 100 comprises a processor 101 and a memory 102. The memory 102 comprises instructions executable by the processor 101.

In an embodiment, the processor 101 is operative to encode the delta quantized coefficients of the pixel block based on the information derived from the estimated quantized coefficients for the pixel block.

In another embodiment, the processor 101 is operative to decode the encoded delta quantized coefficients of the pixel block based on the information derived from the estimated quantized coefficients for the pixel block to obtain the delta quantized coefficients.

Optionally, the guided transcoder 100 may also include a communication circuit 103. The communication circuit 103 may include functions for wired and/or wireless communication with other devices and/or network nodes in the wireless communication network. In a particular example, the communication circuit 103 may be based on radio circuitry for communication with one or more other nodes, including transmitting and/or receiving information. The communication circuit 103 may be interconnected to the processor 101 and/or memory 102. By way of example, the communication circuit 103 may include any of the following: a receiver, a transmitter, a transceiver, input/output (I/O) circuitry, input port(s) and/or output port(s).

Figure 21:
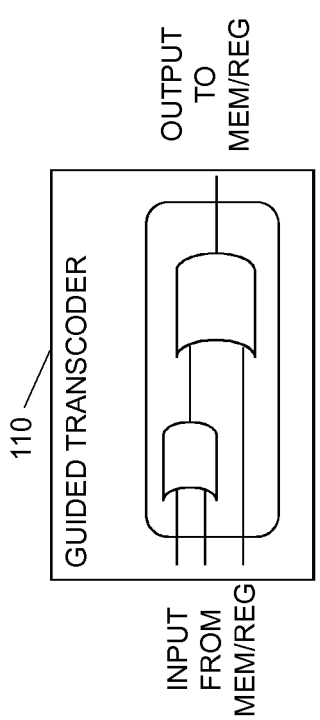
FIG. 21 is a schematic illustration of a guided transcoder according to another embodiment.

FIG. 21 is a schematic block diagram illustrating another example of a guided transcoder 110, based on a hardware circuitry implementation according to an embodiment. Particular examples of suitable hardware circuitry include one or more suitably configured or possibly reconfigurable electronic circuitry, e.g. Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 22:
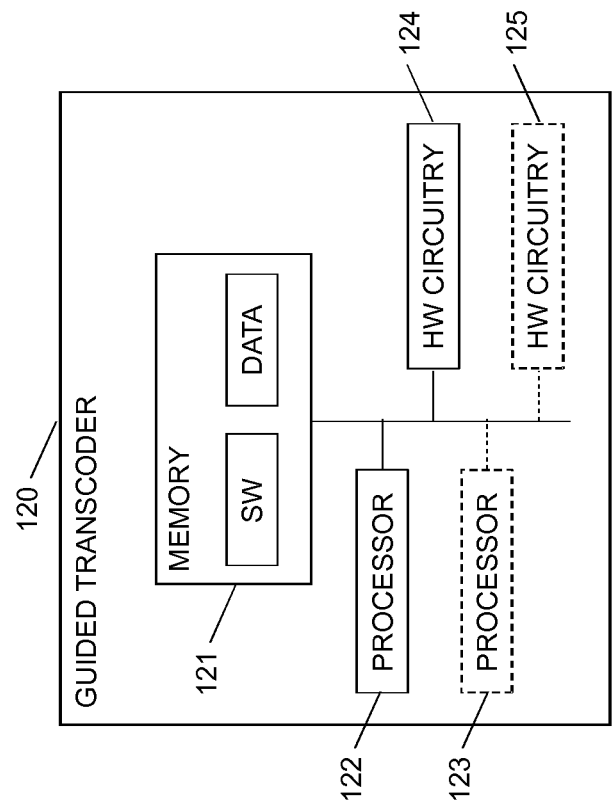
FIG. 22 is a schematic illustration of a guided transcoder according to a further embodiment.

FIG. 22 is a schematic block diagram illustrating yet another example of a guided transcoder 120, based on combination of both processor(s) 122, 123 and hardware circuitry 124, 125 in connection with suitable memory unit(s) 121. The device 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

FIG. 23 is a schematic diagram illustrating an example of a computer-implementation of 200 according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution.

An optional input/output device 230 may also be interconnected to the processor(s) 210 and/or the memory 220 to enable input and/or output of relevant data such as video sequences, encoded video sequences and requests for video sequences.

The term 'processor' should be interpreted in a general sense as any system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to encode delta quantized coefficients of a pixel block in a picture in a first representation of a video sequence based on information derived from estimated quantized coefficients for the pixel block. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

In another particular embodiment, the computer program 240 comprises instructions, which when executed by at least one processor 210, cause the at least one processor 210 to decode encoded delta quantized coefficients of a pixel block in a picture in a first representation of a video sequence based on information derived from estimated quantized coefficients for the pixel block to obtain delta quantized coefficients. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

In further embodiments, the computer program 240 comprises instructions, which when executed by the at least one processor 210 cause the at least one processor to perform any of the previously described encoding or decoding embodiments.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a computer or equivalent processing device 200 for execution by the processing circuitry 210 thereof.

The flow diagram or diagrams presented herein may be regarded as a computer flow diagram or diagrams, when performed by one or more processors. A corresponding guided transcoder may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

FIG. 24 is a schematic diagram illustrating an example of a guided transcoder 130 comprising a delta quantized coefficient encoder 131 for encoding delta quantized coefficients of a pixel block in a picture in a first representation of a video sequence based on information derived from estimated quantized coefficients for the pixel block. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

FIG. 25 is a schematic diagram illustrating another example of a guided transcoder 140 comprising a delta quantized coefficient decoder 141 for decoding encoded delta quantized coefficients of a pixel block in a picture in a first representation of a video sequence based on information derived from estimated quantized coefficients for the pixel block to obtain delta quantized coefficients. The delta quantized coefficients represent a difference between actual quantized coefficients of the pixel block derived by encoding at least a portion of the picture in the first representation of the video sequence and the estimated quantized coefficients. The estimated quantized coefficients represent a difference between a reconstructed block of a corresponding picture in a second representation of the video sequence and a prediction block obtained based on intra mode information and/or inter motion information derived by encoding the picture in the first representation of the video sequence.

FIG. 26 is a schematic diagram illustrating a further example of a guided transcoder 150. This guided transcoder 150 is basically a combination of the embodiments shown in FIGS. 24 and 25. Accordingly, the guided transcoder 150 of this embodiment comprises a delta quantized coefficient encoder 151 and a delta quantized coefficient decoder 152.

It is becoming increasingly popular to provide computing services (hardware and/or software) in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

Figure 27:
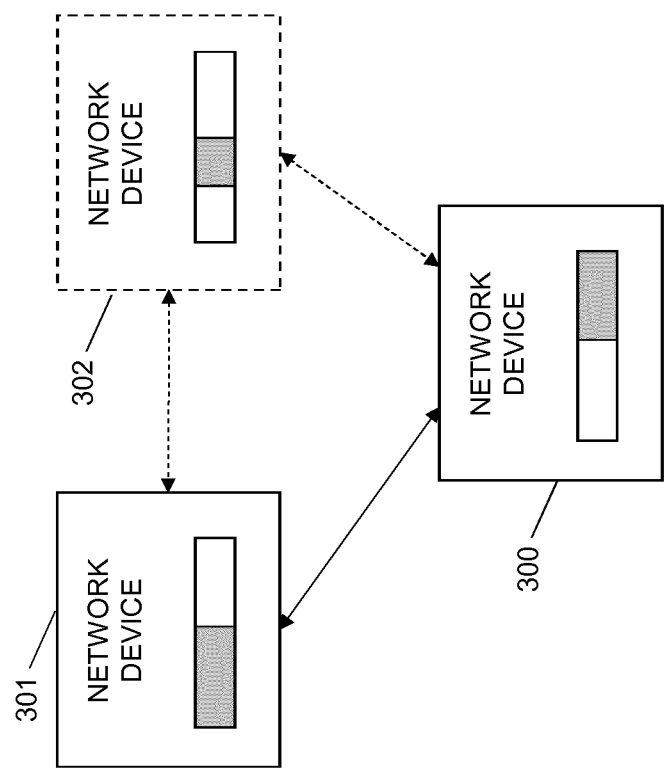
FIG. 27 schematically illustrates a distributed implementation among multiple network devices.

FIG. 27 is a schematic diagram illustrating an example of how functionality can be distributed or partitioned between different network devices in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless communication system, or one or more of the network devices may be so-called cloud-based network devices located outside of the wireless communication system.

Figure 28:
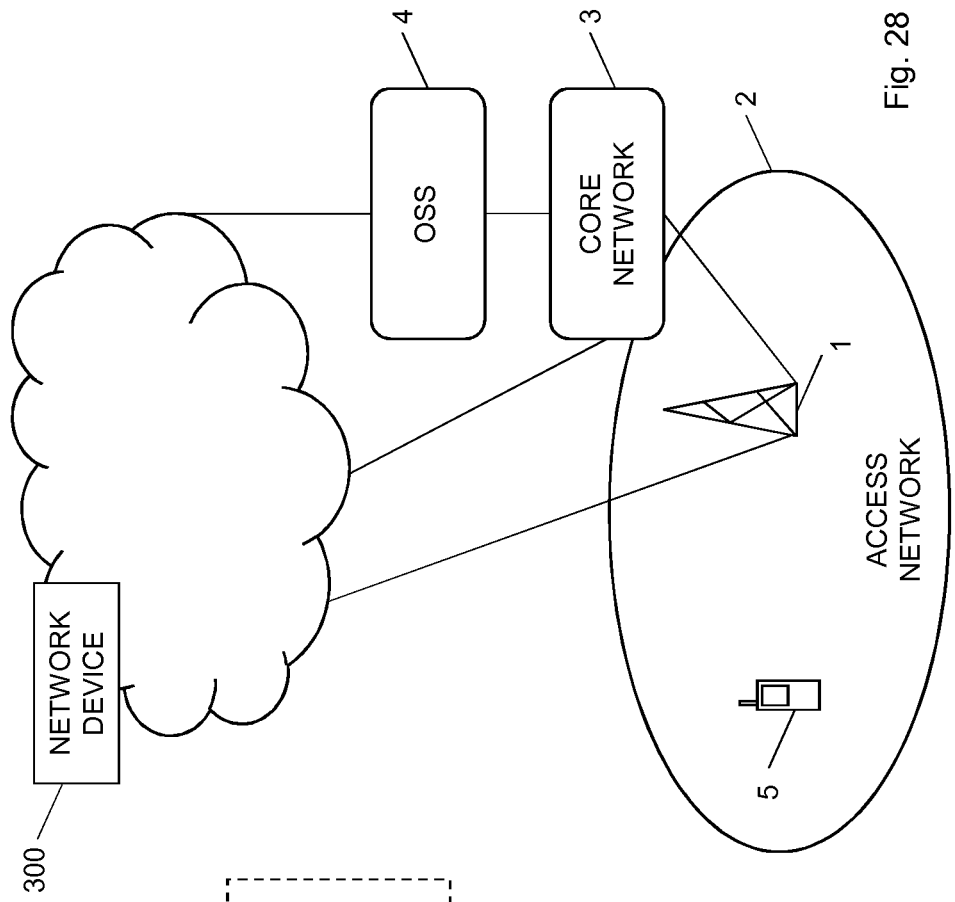
FIG. 28 is a schematic illustration of an example of a wireless communication system with one or more cloud-based network devices according to an embodiment.

FIG. 28 is a schematic diagram illustrating an example of a wireless communication network or system, including an access network 2 and/or a core network 3 and/or an operations and support system (OSS), 4 in cooperation with one or more cloud-based network devices 300. The figure also illustrates a user device 5 connected to the access network 2 and capable of conducting wireless communication with a base station representing an embodiment of a wireless communication device 1.

The present embodiment have mainly been described above with regard to encoding and decoding of delta quantized coefficients in connection with guided transcoding. However, the embodiments are not limited thereto, which has been further described herein, and can, for instance, be applied to encoding and decoding of coefficients in connection with SVC and MVC or general video coding.

Thus, in a general aspect a coefficient encoding method is provided. The method comprises encoding first coefficients of a pixel block in a picture in a first representation of a video sequence based on information derived from second coefficients for a corresponding pixel block in a picture in a second representation of the video sequence.

A corresponding coefficient decoding method comprises decoding encoded first coefficients of a pixel block in a picture in a first representation of a video sequence based on information derived from second coefficients for a corresponding pixel block in a picture in a second representation of the video sequence.

In an embodiment, the corresponding pixel block is a co-located pixel block, i.e. a pixel block occupying a same position in the picture in the second representation of the video sequence as the pixel block occupies in the picture of the first representation of the video sequence.

In an embodiment, the corresponding pixel block is obtained based on intra mode information and/or inter motion information derived by encoding the picture in the first representation of the video sequence.

In another embodiment, the corresponding pixel block is based on a difference between a reconstructed block and a prediction block, where the prediction block is obtained based on intra mode information and/or inter motion information derived by encoding the picture in the first representation of the video sequence. The reconstructed block is preferably a co-located block in the second or third representation of the video sequence. For instance, this reconstructed block can be obtained by encoding the video sequence, decoding the encoded video sequence and then resizing the decoded video sequence, such as downsizing or downsampling the video sequence. In other example, the reconstructed block is obtained by resized the video sequence, such as downsizing or downsampling the video sequence, encoding the resized video sequence, decoding the encoded resized video sequence and then resizing the decoded video sequence, such as upsizing or upsampling the video sequence. In either example, the reconstructed block preferably has a same quality or resolution level as the pixel block.

In a further embodiment, the corresponding pixel block is based on a difference between a first prediction block and a second prediction block. In an example, the first prediction block is obtained based on intra mode information and/or inter motion information derived by encoding the picture in the first representation of the video sequence. In such a case, the second prediction block could be obtained based on a displaced version of the first prediction block, such as obtained based on an adjustment of the intra mode information and/or the inter motion information.

In an embodiment, the first and second coefficients are first and second quantized transform coefficients, i.e. obtained by applying a transformation and then quantization of residual pixel values. In another embodiment, the first and second coefficients are first and second transform coefficients, i.e. obtained by applying a transformation on residual pixel values but not necessarily application of any quantization. In a further embodiment, the first and second coefficients are quantized residual pixel values, i.e. obtained by applying a quantization on residual pixel values.

In an embodiment, the first and second representations of the video sequence are different layers in a SVC coding. In another embodiment, the first and second representations of the video sequences are different views in a MVC coding.

In an embodiment, a syntax element, such as a flag, for instance SigMapIdentical flag, is encoded to have a first value if a significance map of the second coefficients is used as a significance map for the first coefficients, i.e. if the significance maps for both first and second coefficients are identical. In such a case, it is not necessary to encode any of the last significant position, coded sub-block flags or the significance map for the first coefficients. If the significance maps are not identical, the syntax element is instead encoded to have a second value. In such a case, the significance map needs to encoded for the first coefficients.

The corresponding decoding side involves parsing the syntax element to determine, based on its value, whether the significance map of the first coefficients can be determined from the second coefficients, such as from the last significant position, coded sub-block flags or the significance map for the second coefficients.

In an alternative or additional embodiment, a syntax element, such as a flag, for instance LscIdentical flag, is encoded to have a first value if a position of a last significant, i.e. non-zero, first coefficient in a pixel block is the same as a position of a last significant second coefficient in the corresponding pixel block. In such a case, it is not necessary to encode the last significant position for the first coefficients. If the last significant positions are not identical, the syntax element is instead encoded to have a second value. In such a case, the last significant position needs to encoded for the first coefficients.

The corresponding decoding side involves parsing the syntax element to determine, based on its value, whether the last significant position of the first coefficients can be determined from the second coefficients, such as from the last significant position for the second coefficients.

The above mentioned embodiments preferably also comprises encoding and decoding, respectively, the number of significant first coefficients in the pixel block or sub-block. Alternatively, or in addition, the above mentioned embodiments also comprise encoding and decoding, respectively, an adjusted position of the last significant first coefficient in the pixel block or sub-block.

The general aspects of these embodiments also relates to a coefficient encoder configured to encode first coefficients of a pixel block in a picture in a first representation of a video sequence based on information derived from second coefficients for a corresponding pixel block in a picture in a second representation of the video sequence and a coefficient decoder configured to decode encoded first coefficients of a pixel block in a picture in a first representation of a video sequence based on information derived from second coefficients for a corresponding pixel block in a picture in a second representation of the video sequence.

The coefficient encoder and/or decoder can be implemented in a similar way to the guided transcoder described in the foregoing and as shown in FIGS. 20-23, 27 and 28.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

1. Nordgren, Guided Transcoding for Next-Generation Video Coding (HEVC), Master's thesis work, Master's thesis, Lund University, Department of Computer Science, Faculty of Engineering LTH, May 11, 2016
2. Sole et al., Transform Coefficient Coding in HEVC, *IEEE Transactions on Circuits and Systems for Video Technology*, 2012, 22(12): 1765-1777

The invention claimed is:

1. A guided transcoder configured to encode delta quantized coefficients of a pixel block in a picture in a first representation of a video sequence based on information derived from estimated quantized coefficients for said pixel block, said delta quantized coefficients representing a difference between actual quantized coefficients of said pixel block derived by encoding at least a portion of said picture in said first representation of said video sequence and said estimated quantized coefficients, said estimated quantized coefficients representing a difference between a reconstructed block of a corresponding picture in a second representation of said video sequence and a prediction block obtained based on intra mode information and/or inter motion information derived by encoding said picture in said first representation of said video sequence, characterized in that said guided transcoder is configured to use an adjusted scanning pattern determined based on said estimated quantized coefficients, wherein the adjusted scanning pattern defining first processing of delta quantized coefficients occupying positions in said pixel block corresponding to positions of non-zero estimated quantized coefficients in said pixel block followed by processing delta quantized coefficients occupying remaining positions in said pixel block.

2. The guided transcoder according to claim 1, wherein said guided transcoder is configured to encode a syntax element for said pixel block indicating whether a position of a non-zero delta quantized coefficient in said pixel block is predicted from a position of a non-zero estimated quantized coefficient in said pixel block or said position is encoded for said pixel block.

3. The guided transcoder according to claim 2, wherein said guided transcoder is configured to encode a flag for said pixel block indicating whether said position of said non-zero delta quantized coefficient in said pixel block is the same as said position of said non-zero estimated quantized coefficient in said pixel block or said position is encoded for said pixel block.

4. The guided transcoder according to claim 1, wherein said guided transcoder is configured to encode a syntax element representing a difference in a position of a non-zero delta quantized coefficient in said pixel block and a position of a non-zero estimated quantized coefficient in said pixel block.

5. The guided transcoder according to claim 1, wherein said guided transcoder is configured to encode the number of non-zero delta quantized coefficients in said pixel block or in a sub-block of said pixel block, or encode an adjusted position of a last non-zero delta quantized coefficient in said pixel block or in said sub-block of said pixel block.

6. The guided transcoder according to claim 1, wherein
said guided transcoder is configured to encode a flag indicating whether information derived from said estimated quantized coefficients is used to encode said delta quantized coefficients; and
said guided transcoder is configured to encode, if said flag indicates that information derived from said estimated quantized coefficients is used to encode said delta quantized coefficients, the number of non-zero delta quantized coefficients in said pixel block or in a sub-block of said pixel block, or an adjusted position of a last non-zero delta quantized coefficient in said pixel block or in said sub-block of said pixel block.

7. The guided transcoder according to claim 1, wherein said guided transcoder is configured to select an encoding context for a non-zero delta quantized coefficient in said pixel block based on a magnitude of an estimated quantized coefficient occupying a corresponding position as said non-zero delta quantized coefficient occupies in said pixel block; and
said guided transcoder is configured to encode said non-zero delta quantized coefficient based on said selected encoding context.

8. The guided transcoder according to claim 1, wherein said guided transcoder is configured to encode syntax element for said pixel block indicating whether a significance map for said delta quantized coefficients is determined based on a significance map for said estimated quantized coefficients or said significance map for said delta quantized coefficients is determined independent on said significance map for said estimated quantized coefficients.

9. The guided transcoder according to claim 1, further comprising:
a processor; and
a memory comprising instructions executable by said processor, wherein said processor is operative to encode said delta quantized coefficients of said pixel block based on said information derived from said estimated quantized coefficients for said pixel block.

10. A guided transcoder configured to decode encoded delta quantized coefficients of a pixel block in a picture in a first representation of a video sequence based on information derived from estimated quantized coefficients for said pixel block to obtain delta quantized coefficients, said delta quantized coefficients representing a difference between actual quantized coefficients of said pixel block derived by encoding at least a portion of said picture in said first representation of said video sequence and said estimated quantized coefficients, said estimated quantized coefficients representing a difference between a reconstructed block of a corresponding picture in a second representation of said video sequence and a prediction block obtained based on intra mode information and/or inter motion information derived by encoding said picture in said first representation of said video sequence, characterized in that said guided transcoder is configured to use an adjusted scanning pattern determined based on said estimated quantized coefficients, wherein the adjusted scanning pattern defining first processing of delta quantized coefficients occupying positions in said pixel block corresponding to positions of non-zero estimated quantized coefficients in said pixel block followed by processing delta quantized coefficients occupying remaining positions in said pixel block.

11. The guided transcoder according to claim 10, wherein
said guided transcoder is configured to parse a syntax element for said pixel block indicating whether a position of a non-zero delta quantized coefficient in said pixel block is predicted from a position of a non-zero estimated quantized coefficient in said pixel block or said position is decoded from said encoded delta quantized coefficients; and
said guided transcoder is configured to determine said position of said last non-zero delta quantized coefficient based on said syntax element.

12. The guided transcoder according to claim 11, wherein said guided transcoder is configured to parse a flag for said pixel block indicating whether a position of said non-zero delta quantized coefficient in said pixel block is the same as said position of said non-zero estimated quantized coefficient in said pixel block or said position is decoded from said encoded delta quantized coefficients.

13. The guided transcoder according to any of the claim 11, wherein
said guided transcoder is configured to decode a syntax element representing a difference in a position of a non-zero delta quantized coefficient in said pixel block and a position of a non-zero estimated quantized coefficient in said pixel block; and
said guided transcoder is configured to determine said position of said non-zero delta quantized coefficient based on said syntax element and said position of said non-zero estimated quantized coefficient in said pixel block.

14. The guided transcoder according to claim 10, wherein said guided transcoder is configured to decode a syntax element representing the number of non-zero delta quantized coefficients in said pixel block in a sub-block of said pixel block, or representing an adjusted position of a last non-zero delta quantized coefficient in said pixel block or in said sub-block of said pixel block.

15. The guided transcoder according to claim 10, wherein
said guided transcoder is configured to parse a flag indicating whether information derived from said estimated quantized coefficients is used to decode said encoded delta quantized coefficients; and
said guided transcoder is configured to decode, if said flag indicates that information derived from said estimated quantized coefficients is used to decode said encoded delta quantized coefficients, a syntax element representing the number of non-zero delta quantized coefficients in said pixel block or in a sub-block of said pixel block, or representing an adjusted position of a last non-zero delta quantized coefficient in said pixel block or in said sub-block of said pixel block.

16. The guided transcoder according to claim 10, wherein
said guided transcoder is configured to select a decoding context for an encoded non-zero delta quantized coefficient in said pixel block based on a magnitude of an estimated quantized coefficient occupying a corresponding position as said non-zero delta quantized coefficient occupies in said pixel block; and
said guided transcoder is configured to decode said encoded non-zero delta quantized coefficient based on said selected decoding context.

17. The guided transcoder according to claim 10, wherein
said guided transcoder is configured to parse a syntax element for said pixel block indicating whether a significance map for said delta quantized coefficients is determined based on a significance map for said estimated quantized coefficients; and
said guided transcoder is configured to determine, if said syntax element indicates that said significance map for said delta quantized coefficients is determined based on said significance map for said estimated quantized coefficients, said significance map for said delta quantized coefficients based on said significance map for said estimated quantized coefficients.

18. The guided transcoder according to claim 10, further comprising:
a processor; and
a memory comprising instructions executable by said processor, wherein
said processor is operative to decode said encoded delta quantized coefficients of said pixel block based on said information derived from said estimated quantized coefficients for said pixel block to obtain said delta quantized coefficients.

* * * * *